(12) United States Patent
Tsai et al.

(10) Patent No.: US 8,947,790 B2
(45) Date of Patent: Feb. 3, 2015

(54) IMAGING LENS ASSEMBLY

(71) Applicant: Largan Precision Co., Ltd., Taichung (TW)

(72) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 58 days.

(21) Appl. No.: 13/921,223

(22) Filed: Jun. 19, 2013

(65) Prior Publication Data

US 2014/0362454 A1 Dec. 11, 2014

(30) Foreign Application Priority Data

Jun. 7, 2013 (TW) .............................. 102120434 A

(51) Int. Cl.
*G02B 9/60* (2006.01)
*G02B 3/02* (2006.01)
*G02B 3/04* (2006.01)

(52) U.S. Cl.
CPC ...................................... *G02B 3/04* (2013.01)
USPC .......................................... 359/764; 359/714

(58) Field of Classification Search
USPC .......................................... 359/714, 763, 764
See application file for complete search history.

(56) References Cited

U.S. PATENT DOCUMENTS

| 7,864,454 | B1 * | 1/2011 | Tang et al. | ..................... 359/764 |
| 8,780,460 | B2 * | 7/2014 | Tsai et al. | ..................... 359/714 |

* cited by examiner

*Primary Examiner* — Jack Dinh
(74) *Attorney, Agent, or Firm* — CKC & Partners Co., Ltd.

(57) ABSTRACT

An imaging lens assembly includes five lens elements with refractive power, in order from an object side to an image side, a first lens element, a second lens element, a third lens element, a fourth lens element and a fifth lens element. The first lens element with positive refractive power has a convex object-side surface. The second lens element has positive refractive power. The third lens element has refractive power. The fourth lens element with refractive power has a concave image-side surface, wherein both of an object-side surface and the image-side surface of the fourth lens element are aspheric. The fifth lens element with refractive power has a concave image-side surface, wherein at least one inflection point is formed on the image-side surface of the fifth lens element, and both of an object-side surface and the image-side surface of the fifth lens element are aspheric.

25 Claims, 19 Drawing Sheets

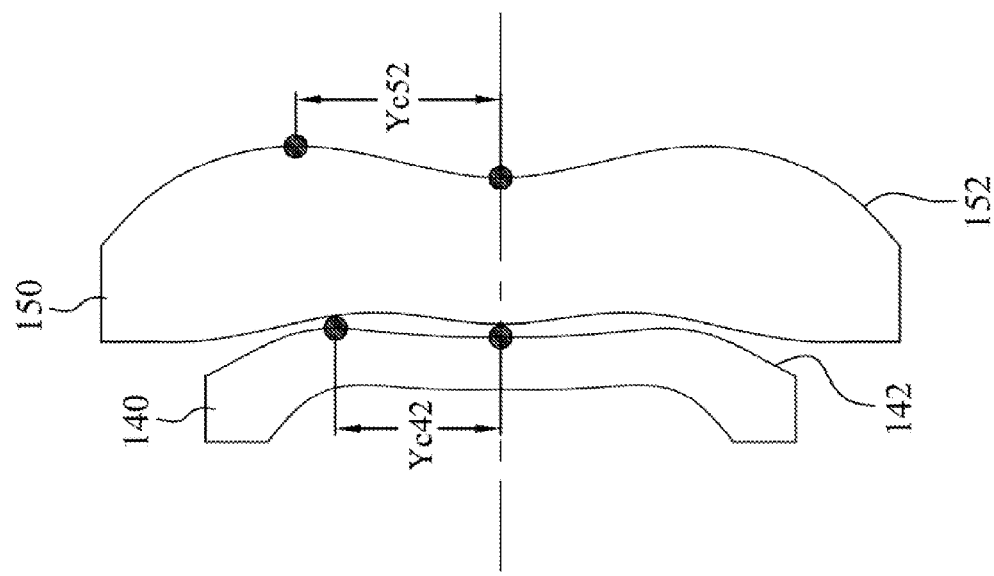

IMAGING LENS ASSEMBLY

RELATED APPLICATIONS

The application claims priority to Taiwan Application Serial Number 102120434, filed Jun. 7, 2013, which is herein incorporated by reference.

BACKGROUND

1. Technical Field

The present disclosure relates to an imaging lens assembly. More particularly, the present disclosure relates to a miniaturized imaging lens assembly applicable to electronic products.

2. Description of Related Art

In recent years, with the popularity of mobile products having camera functionalities, a demand for optical system is increasing. A photosensitive sensor of a conventional optical system is typically a CCD (Charge-Coupled Device) or a CMOS (Complementary Metal-Oxide-Semiconductor) sensor. As the advanced semiconductor manufacturing technologies have allowed a pixel size of sensors to be reduced and the optical systems have gradually evolved toward a field of higher megapixels, there is an increasing demand for better image quality.

A conventional optical system employed in a portable electronic product, mainly adopts a structure of four lens elements. Due to the popularity of mobile products with high-end specifications, such as smart phones and PDAs (Personal Digital Assistants), requirements of higher megapixels and better image quality have been increasing rapidly. However, the conventional optical systems cannot satisfy the requirements of high-end optical systems with camera functionalities.

A conventional optical system with five lens elements has a positive first lens element together with a negative second lens element. Therefore, it tends to overload the positive refractive power on one single lens element resulting in excessive spherical aberrations and worse image quality.

SUMMARY

According to one aspect of the present disclosure, an imaging lens assembly includes five lens elements with refractive power, in order from an object side to an image side, a first lens element, a second lens element, a third lens element, a fourth lens element and a fifth lens element. The first lens element with positive refractive power has a convex object-side surface. The second lens element has positive refractive power. The third lens element has refractive power. The fourth lens element with refractive power has a concave image-side surface, wherein both of an object-side surface and the image-side surface of the fourth lens element are aspheric. The fifth lens element with refractive power has a concave image-side surface, wherein at least one inflection point is formed on the image-side surface of the fifth lens element, and both of an object-side surface and the image-side surface of the fifth lens element are aspheric. When a focal length of the first lens element is f1, a focal length of the second lens element is f2, a curvature radius of an object-side surface of the first lens element is R1, and a curvature radius of an image-side surface of the first lens element is R2, the following relationships are satisfied:

$0<f1/f2<1$; and $|R1/R2|<1$.

According to another aspect of the present disclosure, an imaging lens assembly includes five lens elements with refractive power, in order from an object side to an image side, a first lens element, a second lens element, a third lens element, a fourth lens element and a fifth lens element. The first lens element with positive refractive power has a convex object-side surface. The second lens element has positive refractive power. The third lens element has refractive power. The fourth lens element with refractive power has a concave image-side surface, wherein both of an object-side surface and the image-side surface of the fourth lens element are aspheric. The fifth lens element with refractive power has a concave image-side surface, wherein at least one inflection point is formed on the image-side surface of the fifth lens element, and both of an object-side surface and the image-side surface of the fifth lens element are aspheric. When a focal length of the first lens element is f1, a focal length of the second lens element is f2, an axial distance between the third lens element and the fourth lens element is T34, and a central thickness of the fourth lens element is CT4, the following relationships are satisfied:

$0<f1/f2<5$; and $0.4<T34/1CT4<3.0$.

According to still another aspect of the present disclosure, an image capturing device includes the imaging lens assembly according to said aspect and an image sensor. The image sensor is located on an image plane side of said imaging lens assembly.

BRIEF DESCRIPTION OF THE DRAWINGS

The disclosure can be more fully understood by reading the following detailed description of the embodiments, with reference made to the accompanying drawings as follows:

FIG. 19 shows Yc42 and Yc52 of the fourth lens element and the fifth lens element of the imaging lens assembly according to the FIG. 1.

DETAILED DESCRIPTION

Figure 1:
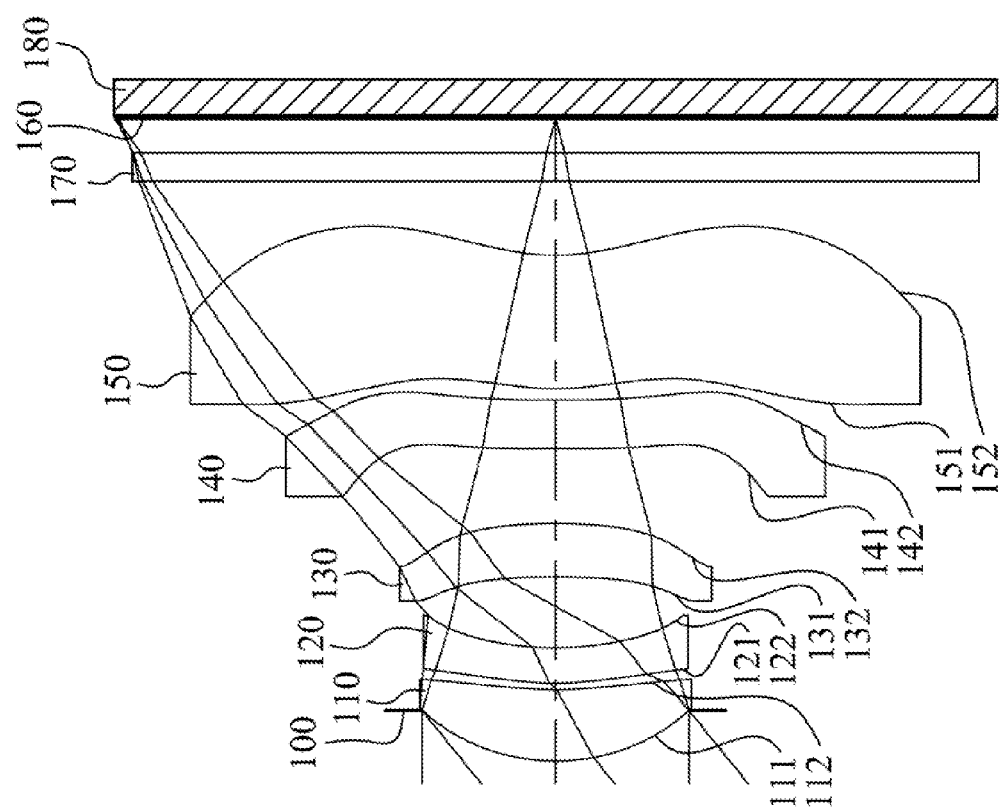
FIG. 1 is a schematic view of an imaging lens assembly according to the 1st embodiment of the present disclosure.

An imaging lens assembly includes five lens elements with refractive power, in order from an object side to an image side, a first lens element, a second lens element, a third lens element, a fourth lens element and a fifth lens element. The imaging lens assembly further includes an image sensor which is disposed on an image plane.

The first lens element with positive refractive power has a convex object-side surface and can have a concave image-side surface, so that it is favorable for reducing the total track length of the imaging lens assembly by properly adjusting the positive refractive power of the first lens element.

The second lens element with positive refractive power can have a convex object-side surface and a concave image-side surface. Therefore, it is favorable for effectively distributing the positive refractive power of the imaging lens assembly so as to avoid overloading the positive refractive power on one single lens element resulting in excessive aberrations.

The third lens element can have positive refractive power, a concave object-side surface and a convex image-side surface. Therefore, it is favorable for further balancing the positive refractive powers of the first lens element and the second lens element so as to avoid resulting in excessive spherical aberrations.

The fourth lens element with negative refractive power can have a concave image-side surface. Therefore, it is favorable for correcting the aberration of the imaging lens assembly. Moreover, both of the object-side surface and the image-side surface of the fourth lens element can have at least one inflection point, so that the aberration of the off-axis can be effectively corrected.

The fifth lens element can have a convex object-side surface and has a concave image-side surface. Therefore, it is favorable for correcting the astigmatism and a principal point of the imaging lens assembly can be positioned away from the image plane for reducing a back focal length so as to maintain a compact size thereof. Moreover, the image-side surface of the fifth lens element has at least one inflection point and the object-side surface of the fifth lens element can have at least one inflection point; therefore, an angle at which the incident light projects onto an image sensor from the off-axis can be effectively reduced so as to further correct the aberration of the off-axis.

When a focal length of the first lens element is f1, and a focal length of the second lens element is f2, the following relationship is satisfied: $0<f1/f2<5$. Therefore, it is favorable for balancing the light gathering ability of the imaging lens assembly so as to improve image quality. Preferably, the following relationship is satisfied: $0<f1/f2<1$.

When a curvature radius of the object-side surface of the first lens element is R1, and a curvature radius of the image-side surface of the first lens element is R2, the following relationship is satisfied: $|R1/R2|<1$. Therefore, it is favorable for reducing the spherical aberration and the astigmatism.

When an axial distance between the third lens element and the fourth lens element is T34, and a central thickness of the fourth lens element is CT4, the following relationship is satisfied: $0.4<T34/CT4<3.0$. Therefore, it is favorable for manufacturing and assembling the lens elements so as to increase the manufacturing yield rate.

When a vertical distance between a non-axial critical point on the image-side surface of the fourth lens element and an optical axis is Yc42, and a vertical distance between a non-axial critical point on the image-side surface of the fifth lens element and the optical axis is Yc52, the following relationship is satisfied: $0.5<Yc42/Yc52<1.0$. Therefore, it is favorable for effectively correcting the aberration of the off-axis.

When the focal length of the first lens element is f1, and the focal length of the second lens element is f2, the following relationship is satisfied: $-5<(f1+f2)/(f1-f2)<-1$. Therefore, it is favorable for enhancing balancing the light gathering ability of the imaging lens assembly so as to improve image quality. Preferably, the following relationship is satisfied: $-3.5<(f1+f2)/(f1-f2)<-1$.

When a curvature radius of the image-side surface of the second lens element is R4, and a curvature radius of the object-side surface of the third lens element is R5, the following relationship is satisfied: $-2<(R4+R5)/(R4-R5)<0$. Therefore, it is favorable for reducing the spherical aberration.

When a central thickness of the second lens element is CT2, and a central thickness of the fifth lens element is CT5, the following relationship is satisfied: $2.0<CT5/CT2<5.5$. Therefore, it provides favorable moldability and homogeneity for plastic lens elements.

When an Abbe number of the fourth lens element is V4, the following relationship is satisfied: $10<V4<30$. Therefore, it is favorable for correcting the chromatic aberration of the imaging lens assembly.

When a focal length of the imaging lens assembly is f, and an entrance pupil diameter of the imaging lens assembly is EPD, the following relationship is satisfied: $1.2<f/EPD<2.4$. Therefore, it is favorable for effectively enhancing the exposure of the imaging lens assembly.

When half of the maximal field of view of the imaging lens assembly is HFOV, the following relationship is satisfied: $36 \text{ degrees}<HFOV<50 \text{ degrees}$. Therefore, it is favorable for enlarging the field of view so as to obtain more of the image scene.

When a diagonal length of an effective photosensitive area of the image sensor is DI, and an axial distance between the object-side surface of the first lens element and an image plane is TL, the following relationship is satisfied: $1.2<DI/TL<2.0$. Therefore, it is favorable for reducing the total track length so as to keep the imaging lens assembly compact.

When the focal length of the imaging lens assembly is f, the focal length of the second lens element is f2, a focal length of the third lens element is f3, a focal length of the fourth lens element is f4, and a focal length of the fifth lens element is f5, the following relationship is satisfied: $|f/f2|+|f/f3|+|f/f4|+|f/f5|<1.0$. Therefore, it is favorable for balancing the refractive powers of the imaging lens assembly so as to effectively reduce the aberration.

According to the imaging lens assembly of the present disclosure, an aperture stop can be configured as a front stop or a middle stop. A front stop disposed between an imaged object and a first lens element can provide a longer distance between an exit pupil of the system and an image plane and which improves the image-sensing efficiency of the image sensor. A middle stop disposed between the first lens element and the image plane is favorable for enlarging the field of view of the system and thereby provides a wider field of view for the same.

According to the imaging lens assembly of the present disclosure, the lens elements can be made of plastic or glass material. When the lens elements are made of glass material, the distribution of the refractive power of the imaging lens assembly can be more flexible to design. When the lens elements are made of plastic material, the manufacturing cost thereof can be decreased. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the imaging lens assembly can be effectively reduced.

According to the imaging lens assembly of the present disclosure, the imaging lens assembly can include at least one stop, such as an aperture stop, a glare stop or a field stop. Said glare stop or said field stop is for eliminating the stray light and thereby improving the image resolution thereof.

According to the imaging lens assembly of the present disclosure, when the lens element has a convex surface, it indicates that the surface is convex at the paraxial region thereof; and when the lens element has a concave surface, it indicates that the surface is concave at the paraxial region thereof. Particularly, the paraxial region thereof refers to the region of the surface where light rays travel close to an optical axis and the peripheral region thereof refers to the region of the surface where light rays travel away from the optical axis.

According to the imaging lens assembly of the present disclosure, critical point is a non-axial point of the lens surface where its tangent is perpendicular to the optical axis.

According to the imaging lens assembly of the present disclosure, the imaging lens assembly is featured with good correction ability and high image quality, and can be applied to 3D (three-dimensional) image capturing applications, in products such as digital cameras, mobile devices and tablets.

According to the present disclosure, an image capturing device is provided. The image capturing device includes the imaging lens assembly according to the aforementioned imaging lens assembly of the present disclosure, and an image sensor located on an image plane side of said imaging lens assembly. Accordingly, it is favorable for the imaging lens assembly of the image capturing device avoiding overloading the positive refractive power on one single lens resulting in excessive spherical aberrations. It is also favorable for correcting the image curvature and balancing the light gathering ability so as to improve image quality.

According to the above description of the present disclosure, the following 1st-9th specific embodiments are provided for further explanation.

1st Embodiment

Figure 2:
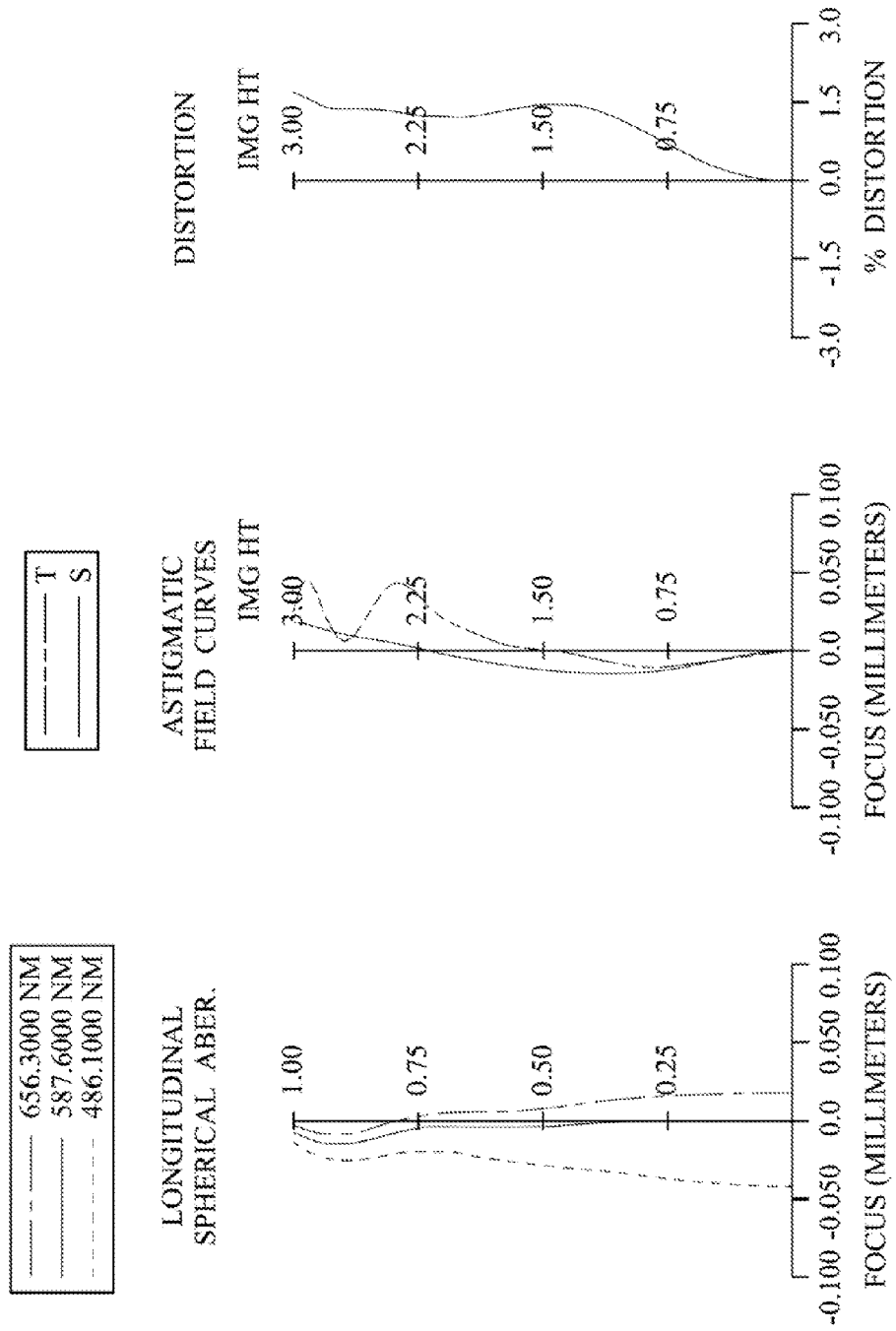
FIG. 2 shows, in order from left to right, spherical aberration curves, astigmatic field curves and a distortion curve of the imaging lens assembly according to the 1st embodiment.

FIG. 1 is a schematic view of an imaging lens assembly according to the 1st embodiment of the present disclosure. FIG. 2 shows, in order from left to right, spherical aberration curves, astigmatic field curves and a distortion curve of the imaging lens assembly according to the 1st embodiment.

In FIG. 1, the imaging lens assembly includes five lens elements with refractive power, in order from an object side to an image side, an aperture stop 100, a first lens element 110, a second lens element 120, a third lens element 130, a fourth lens element 140, a fifth lens element 150, an IR-cut filter 170, an image plane 160 and an image sensor 180.

The first lens element 110 with positive refractive power has a convex object-side surface 111 and a concave image-side surface 112, which are both aspheric, and the first lens element 110 is made of plastic material.

The second lens element 120 with positive refractive power has a convex object-side surface 121 and a concave image-side surface 122, which are both aspheric, and the second lens element 120 is made of plastic material.

The third lens element 130 with positive refractive power has a concave object-side surface 131 and a convex image-side surface 132, which are both aspheric, and the third lens element 130 is made of plastic material.

The fourth lens element 140 with negative refractive power has a concave object-side surface 141 and a concave image-side surface 142, which are both aspheric, and the fourth lens element 140 is made of plastic material. Moreover, both of the object-side surface 141 and the image-side surface 142 of the fourth lens element 140 have at least one inflection point.

The fifth lens element 150 with positive refractive power has a convex object-side surface 151 and a concave image-side surface 152, which are both aspheric, and the fifth lens element 150 is made of plastic material. Moreover, both of the object-side surface 151 and the image-side surface 152 of the fifth lens element 150 have at least one inflection point.

The IR-cut filter 170 is made of glass and located between the fifth lens element 150 and the image plane 160, and will not affect the focal length of the imaging lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i)$$

wherein,

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of the maximal field of view of the imaging lens assembly is HFOV, these parameters have the following values: f=3.65 mm; Fno=2.01; and HFOV=39.0 degrees.

In the imaging lens assembly according to the 1st embodiment, when an Abbe number of the fourth lens element 140 is V4, the following relationship is satisfied: V4=23.3.

In the imaging lens assembly according to the 1st embodiment, when the focal length of the imaging lens assembly is f, and an entrance pupil diameter of the imaging lens assembly is EPD, the following relationship is satisfied: f/EPD=2.01.

In the imaging lens assembly according to the 1st embodiment, when a central thickness of the second lens element 120 is CT2, and a central thickness of the fifth lens element 150 is CT5, the following relationship is satisfied: CT5/CT2=3.85.

In the imaging lens assembly according to the 1st embodiment, when a central thickness of the fourth lens element 140 is CT4, and an axial distance between the third lens element 130 and the fourth lens element 140 is T34, the following relationship is satisfied: T34/CT4=1.58.

In the imaging lens assembly according to the 1st embodiment, when a curvature radius of the object-side surface 111 of the first lens element 110 is R1, and a curvature radius of the image-side surface 112 of the first lens element 110 is R2, the following relationship is satisfied: |R1/R2|=0.58.

In the imaging lens assembly according to the 1st embodiment, when a curvature radius of the image-side surface 122 of the second lens element 120 is R4, and a curvature radius of the object-side surface 131 of the third lens element 130 is R5, the following relationship is satisfied: (R4+R5)/(R4−R5)=−0.51.

In the imaging lens assembly according to the 1st embodiment, when a focal length of the first lens element 110 is f1, and a focal length of the second lens element 120 is f2, the following relationships are satisfied: f1/f2=0.15; and (f1+f2)/(f1−f2)=−1.36.

In the imaging lens assembly according to the 1st embodiment, when the focal length of the imaging lens assembly is f, the focal length of the second lens element 120 is f2, a focal length of the third lens element 130 is f3, a focal length of the fourth lens element 140 is f4, and a focal length of the fifth lens element 150 is f5, the following relationship is satisfied: |f/f2|+|f/f3|+|f/f4|+|f/f5|=0.61.

FIG. 19 shows Yc42 and Yc52 of the fourth lens element 140 and the fifth lens element 150 of the imaging lens assembly according to FIG. 1. In FIG. 19, a vertical distance between a non-axial critical point on the image-side surface 142 of the fourth lens element 140 and an optical axis is Yc42, and a vertical distance between a non-axial critical point on the image-side surface 152 of the fifth lens element 150 and the optical axis is Yc52, the following relationship is satisfied: Yc42/Yc52=0.80.

In the imaging lens assembly according to the 1st embodiment, when a diagonal length of an effective photosensitive area of the image sensor 180 is DI, and an axial distance between the object-side surface 111 of the first lens element 110 and the image plane 160 is TL, the following relationship is satisfied: DI/TL=1.37.

The detailed optical data of the 1st embodiment are shown in Table 1 and the aspheric surface data are shown in Table 2 below.

TABLE 1

1st Embodiment
f = 3.65 mm, Fno = 2.01, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.343 | | | | |
| 2 | Lens 1 | 1.406 | ASP | 0.485 | Plastic | 1.544 | 55.9 | 5.22 |
| 3 | | 2.446 | ASP | 0.044 | | | | |
| 4 | Lens 2 | 1.928 | ASP | 0.236 | Plastic | 1.640 | 23.3 | 34.56 |
| 5 | | 2.011 | ASP | 0.488 | | | | |
| 6 | Lens 3 | −6.165 | ASP | 0.360 | Plastic | 1.544 | 55.9 | 16.28 |
| 7 | | −3.710 | ASP | 0.514 | | | | |
| 8 | Lens 4 | −14.066 | ASP | 0.326 | Plastic | 1.640 | 23.3 | −13.56 |
| 9 | | 22.835 | ASP | 0.080 | | | | |
| 10 | Lens 5 | 1.764 | ASP | 0.909 | Plastic | 1.544 | 55.9 | 267.91 |
| 11 | | 1.461 | ASP | 0.500 | | | | |
| 12 | IR-cut filter | Plano | | 0.200 | Glass | 1.517 | 64.2 | — |
| 13 | | Plano | | 0.242 | | | | |
| 14 | Image | Plano | | — | | | | |

Note:
Reference wavelength is 587.6 nm (d-line).

TABLE 2

Aspheric Coefficients

| | Surface # | | | | |
|---|---|---|---|---|---|
| | 2 | 3 | 4 | 5 | 6 |
| k = | 1.6692E−02 | −2.9895E+01 | −7.8868E+00 | −1.1563E+00 | −1.1015E+01 |
| A4 = | −8.4424E−03 | −1.0637E−01 | −2.4596E−01 | −4.7355E−02 | −9.8092E−02 |
| A6 = | 1.0176E−01 | −1.1492E−01 | 5.2906E−02 | −1.1556E−02 | −2.0964E−01 |
| A8 = | −2.4174E−01 | 8.1258E−01 | 7.0224E−01 | 3.1143E−01 | −1.5121E−01 |
| A10 = | 3.2567E−01 | −1.3854E+00 | −1.1871E+00 | −3.5347E−02 | 2.0761E+00 |
| A12 = | −1.9644E−01 | 1.2127E+00 | 9.4909E−01 | −3.3160E−01 | −5.0602E+00 |

TABLE 2-continued

Aspheric Coefficients

| | | | | |
|---|---|---|---|---|
| A14 = | 4.5306E−02 | −4.8494E−01 | −3.8949E−01 | 2.9033E−01 | 5.2835E−00 |
| A16 = | 5.0001E−11 | −3.1864E−11 | 2.8185E−11 | −1.1774E−11 | −1.9217E+00 |

| | Surface # | | | | |
|---|---|---|---|---|---|
| | 7 | 8 | 9 | 10 | 11 |
| k = | −4.9641E+00 | 4.8928E+00 | −8.2426E+00 | −3.5722E+00 | −3.6379E+00 |
| A4 = | −9.1184E−02 | 3.6616E−01 | 1.5240E−01 | −3.2968E−01 | −1.5137E−01 |
| A6 = | −6.9113E−02 | −6.3253E−01 | −1.8488E−01 | 2.0156E−01 | 8.4458E−02 |
| A8 = | −5.8524E−01 | 5.8376E−01 | 9.2118E−02 | −7.2026E−02 | −3.8323E−02 |
| A10 = | 1.9208E+00 | −3.9280E−01 | −3.7993E−02 | 1.6716E−02 | 1.1308E−02 |
| A12 = | −2.6520E+00 | 1.5517E−01 | 1.2210E−02 | −2.4316E−03 | −1.9643E−03 |
| A14 = | 1.7493E+00 | −3.0629E−02 | −2.1742E−03 | 1.9957E−04 | 1.7950E−04 |
| A16 = | −4.1858E−01 | 2.3466E−03 | 1.5075E−04 | −7.0281E−06 | −6.6040E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
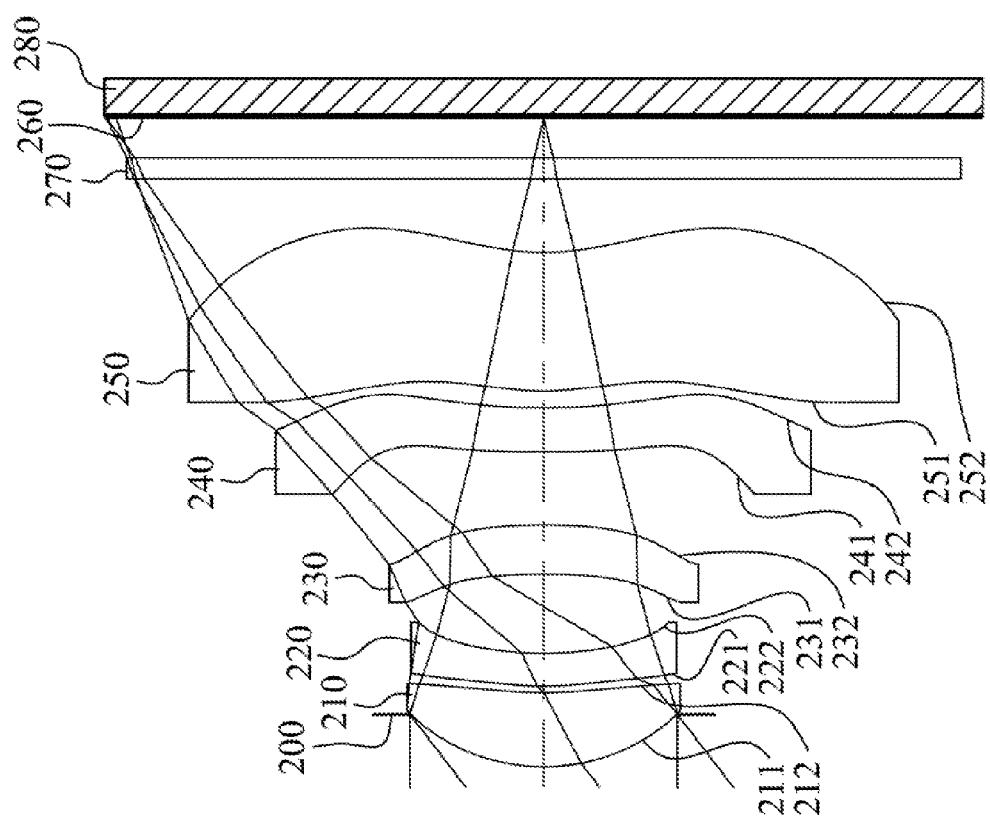
FIG. 3 is a schematic view of an imaging lens assembly according to the 2nd embodiment of the present disclosure.
Figure 4:
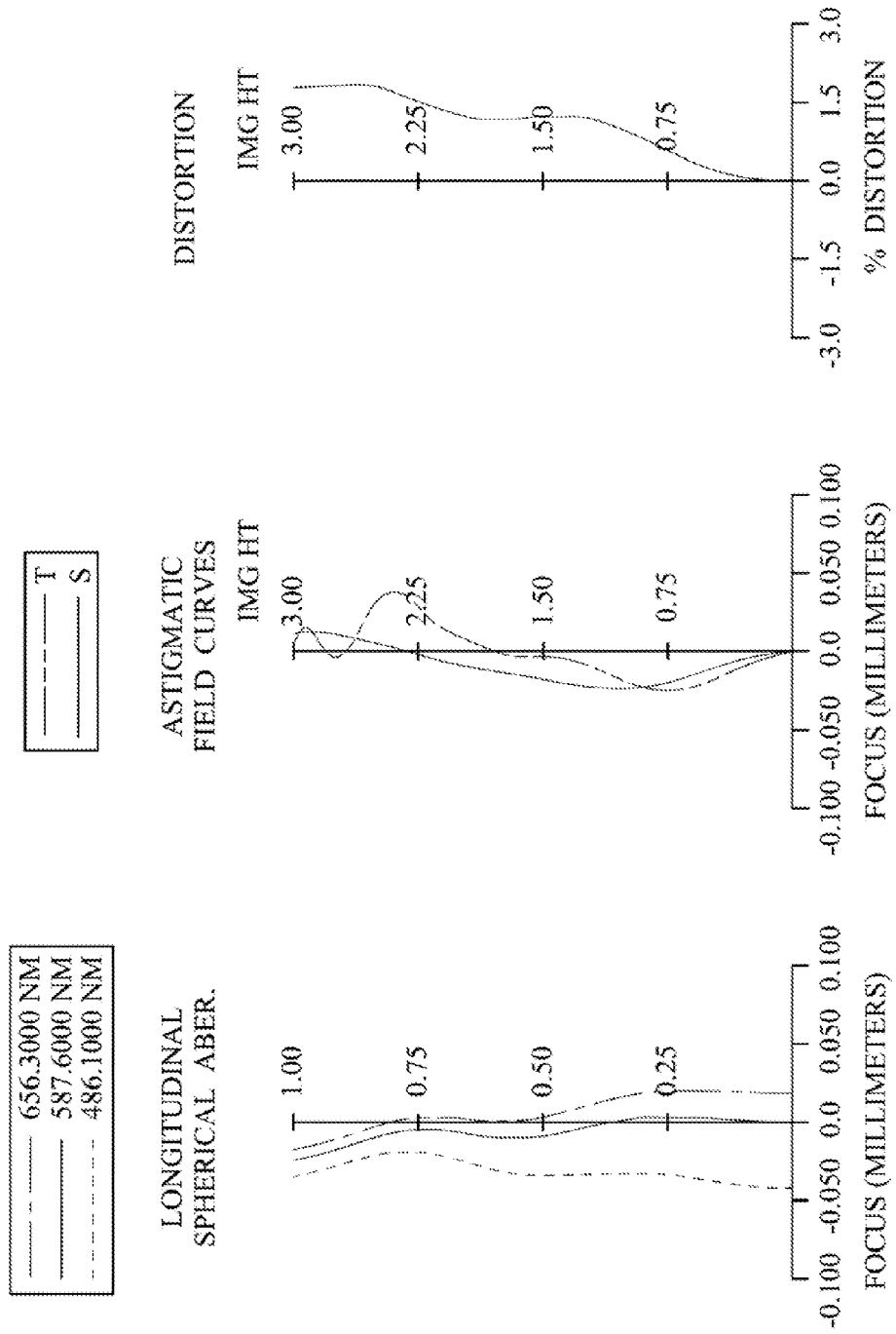
FIG. 4 shows, in order from left to right, spherical aberration curves, astigmatic field curves and a distortion curve of the imaging lens assembly according to the 2nd embodiment.

FIG. 3 is a schematic view of an imaging lens assembly according to the 2nd embodiment of the present disclosure. FIG. 4 shows, in order from left to right, spherical aberration curves, astigmatic field curves and a distortion curve of the imaging lens assembly according to the 2nd embodiment.

In FIG. 3, the imaging lens assembly includes five lens elements with refractive power, in order from an object side to an image side, an aperture stop 200, a first lens element 210, a second lens element 220, a third lens element 230, a fourth lens element 240, a fifth lens element 250, an IR-cut filter 270, an image plane 260 and an image sensor 280.

The first lens element 210 with positive refractive power has a convex object-side surface 211 and a concave image-side surface 212, which are both aspheric, and the first lens element 210 is made of plastic material.

The second lens element 220 with positive refractive power has a convex object-side surface 221 and a concave image-side surface 222, which are both aspheric, and the second lens element 220 is made of plastic material.

The third lens element 230 with positive refractive power has a concave object-side surface 231 and a convex image-side surface 232, which are both aspheric, and the third lens element 230 is made of plastic material.

The fourth lens element 240 with negative refractive power has a convex object-side surface 241 and a concave image-side surface 242, which are both aspheric, and the fourth lens element 240 is made of plastic material. Moreover, both of the object-side surface 241 and the image-side surface 242 of the fourth lens element 240 have at least one inflection point.

The fifth lens element 250 with positive refractive power has a convex object-side surface 251 and a concave image-side surface 252, which are both aspheric, and the fifth lens element 250 is made of plastic material. Moreover, both of the object-side surface 251 and the image-side surface 252 of the fifth lens element 250 have at least one inflection point.

The IR-cut filter 270 is made of glass and located between the fifth lens element 250 and the image plane 260, and will not affect the focal length of the imaging lens assembly.

The detailed optical data of the 2nd embodiment are shown in Table 3 and the aspheric surface data are shown in Table 4 below.

TABLE 3

2nd Embodiment
f = 3.84 mm, Fno = 2.10, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.358 | | | | |
| 2 | Lens 1 | 1.367 | ASP | 0.507 | Plastic | 1.544 | 55.9 | 4.55 |
| 3 | | 2.657 | ASP | 0.045 | | | | |
| 4 | Lens 2 | 2.216 | ASP | 0.220 | Plastic | 1.634 | 23.8 | 113.15 |
| 5 | | 2.199 | ASP | 0.546 | | | | |
| 6 | Lens 3 | −4.765 | ASP | 0.334 | Plastic | 1.634 | 23.8 | 26.28 |
| 7 | | −3.806 | ASP | 0.504 | | | | |
| 8 | Lens 4 | 100.000 | ASP | 0.299 | Plastic | 1.634 | 23.8 | −9.84 |
| 9 | | 5.863 | ASP | 0.114 | | | | |
| 10 | Lens 5 | 1.830 | ASP | 0.952 | Plastic | 1.535 | 55.7 | 36.82 |
| 11 | | 1.652 | ASP | 0.500 | | | | |
| 12 | IR-cut filter | Plano | | 0.145 | Glass | 1.517 | 64.2 | — |
| 13 | | Plano | | 0.289 | | | | |
| 14 | Image | Plano | | — | | | | |

Note:
Reference wavelength is 587.6 nm (d-line).

TABLE 4

Aspheric Coefficients

| | \multicolumn{5}{c}{Surface #} |
|---|---|---|---|---|---|
| | 2 | 3 | 4 | 5 | 6 |
| k = | 2.7302E−02 | −3.0000E+01 | −1.0208E+01 | −1.6386E+00 | −6.7663E+00 |
| A4 = | −6.8825E−03 | −1.0777E−01 | −2.4321E−01 | −5.3988E−02 | −1.0387E−01 |
| A6 = | 9.4726E−02 | −1.2272E−01 | 4.9674E−02 | 1.7080E−02 | −2.1791E−01 |
| A8 = | −2.3166E−01 | 7.9812E−01 | 6.8875E−01 | 3.5121E−01 | −1.5569E−01 |
| A10 = | 3.2333E−01 | −1.3913E+00 | −1.1841E+00 | −1.2480E−01 | 2.1063E+00 |
| A12 = | −2.0361E−01 | 1.2246E+00 | 9.8014E−01 | −3.9380E−01 | −5.0586E+00 |
| A14 = | 3.9302E−02 | −4.6334E−01 | −3.5436E−01 | 5.2478E−01 | 5.2470E+00 |
| A16 = | 6.2625E−13 | −1.0721E−11 | 4.1002E−11 | 6.3655E−12 | −1.9139E+00 |

| | \multicolumn{5}{c}{Surface #} |
|---|---|---|---|---|---|
| | 7 | 8 | 9 | 10 | 11 |
| k = | −5.0208E+00 | 5.0000E+00 | −2.5449E+01 | −3.6422E+00 | −2.9446E+00 |
| A4 = | −8.8513E−02 | 3.1969E−01 | 1.2108E−01 | −3.2102E−01 | −1.6374E−01 |
| A6 = | −5.8835E−02 | −6.0639E−01 | −1.7217E−01 | 2.0032E−01 | 8.5959E−02 |
| A8 = | −5.8054E−01 | 5.7431E−01 | 9.2318E−02 | −7.2140E−02 | −3.8221E−02 |
| A10 = | 1.9176E+00 | −3.9140E−01 | −3.8402E−02 | 1.6718E−02 | 1.1299E−02 |
| A12 = | −2.6411E+00 | 1.5573E−01 | 1.2142E−02 | −2.4283E−03 | −1.9677E−03 |
| A14 = | 1.7580E+00 | −3.0653E−02 | −2.1749E−03 | 1.9999E−04 | 1.7930E−04 |
| A16 = | 4.3347E−01 | 2.3242E−03 | 1.5571E−04 | −7.1032E−06 | −6.5368E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following relationships:

| \multicolumn{4}{c}{2nd Embodiment} |
|---|---|---|---|
| f [mm] | 3.84 | |R1/R2| | 0.51 |
| Fno | 2.10 | (R4 + R5)/(R4 − R5) | −0.37 |
| HFOV [deg.] | 37.5 | f1/f2 | 0.04 |
| V4 | 23.8 | (f1 + f2)/(f1 − f2) | −1.08 |
| f/EPD | 2.10 | |f/f2| + |f/f3| + |f/f4| + |f/f5| | 0.68 |
| CT5/CT2 | 4.33 | Yc42/Yc52 | 0.89 |
| T34/CT4 | 1.69 | DI/TL | 1.35 |

3rd Embodiment

Figure 5:
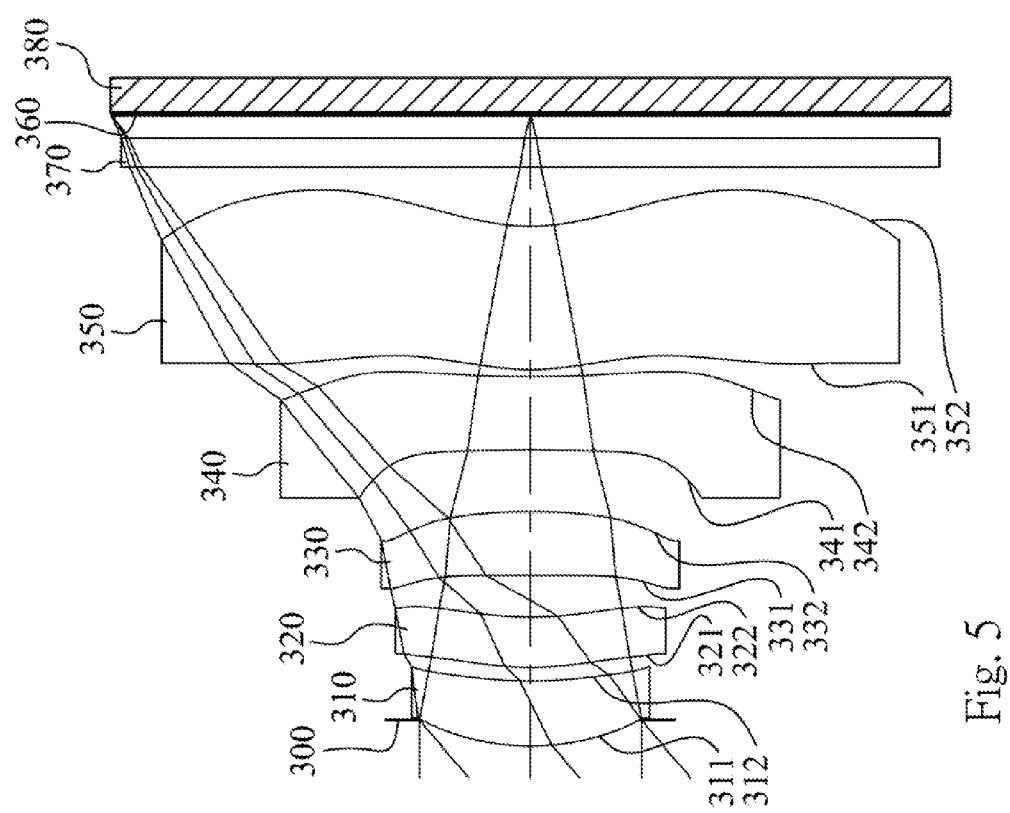
FIG. 5 is a schematic view of an imaging lens assembly according to the 3rd embodiment of the present disclosure.
Figure 6:
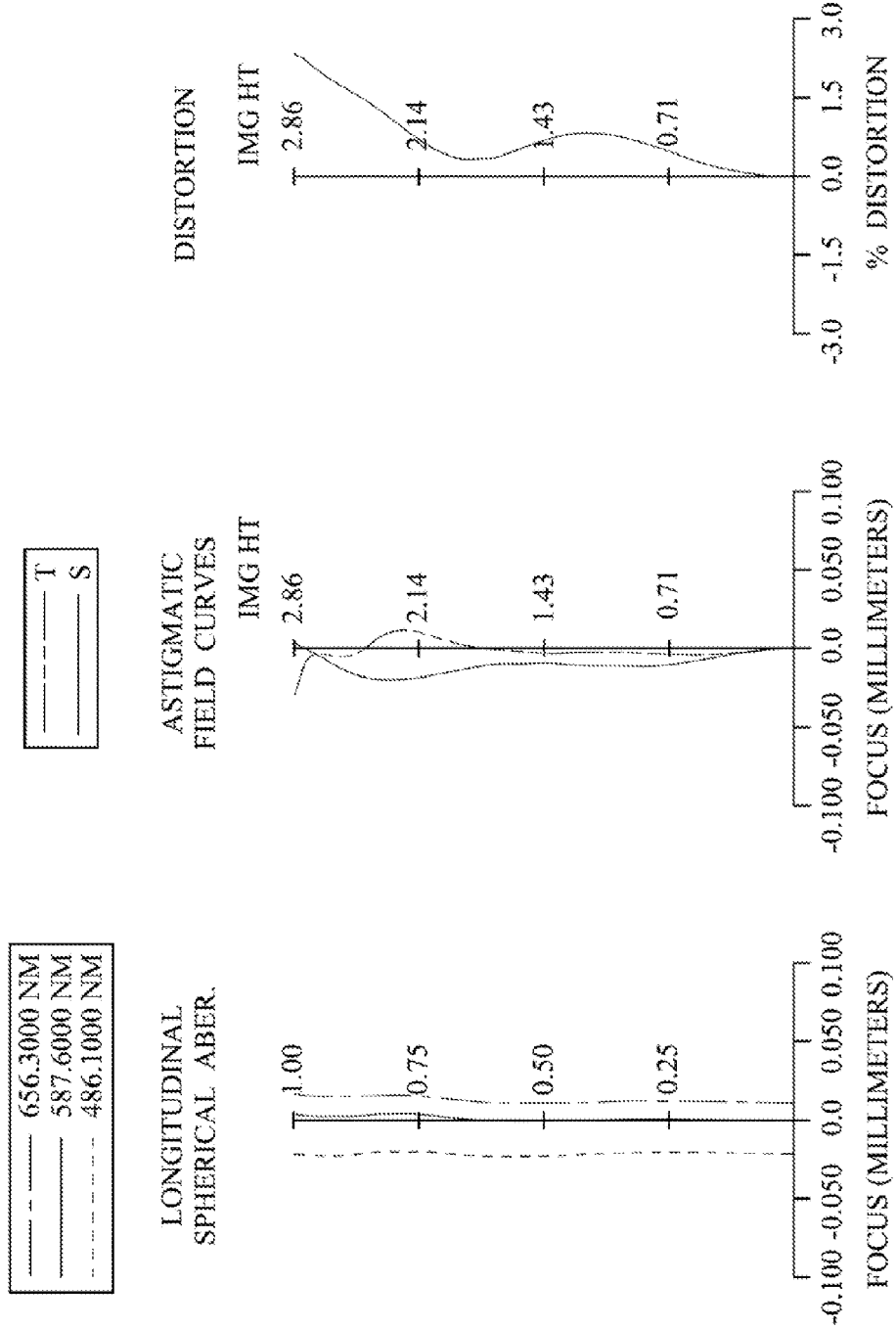
FIG. 6 shows, in order from left to right, spherical aberration curves, astigmatic field curves and a distortion curve of the imaging lens assembly according to the 3rd embodiment.

FIG. 5 is a schematic view of an imaging lens assembly according to the 3rd embodiment of the present disclosure. FIG. 6 shows, in order from left to right, spherical aberration curves, astigmatic field curves and a distortion curve of the imaging lens assembly according to the 3rd embodiment.

In FIG. 5, the imaging lens assembly includes five lens elements with refractive power, in order from an object side to an image side, an aperture stop 300, a first lens element 310, a second lens element 320, a third lens element 330, a fourth lens element 340, a fifth lens element 350, an IR-cut filter 370, an image plane 360 and an image sensor 380.

The first lens element 310 with positive refractive power has a convex object-side surface 311 and a concave image-side surface 312, which are both aspheric, and the first lens element 310 is made of plastic material.

The second lens element 320 with positive refractive power has a convex object-side surface 321 and a concave image-side surface 322, which are both aspheric, and the second lens element 320 is made of plastic material.

The third lens element 330 with positive refractive power has a concave object-side surface 331 and a convex image-side surface 332, which are both aspheric, and the third lens element 330 is made of plastic material.

The fourth lens element 340 with negative refractive power has a concave object-side surface 341 and a concave image-side surface 342, which are both aspheric, and the fourth lens element 340 is made of plastic material. Moreover, both of the object-side surface 341 and the image-side surface 342 of the fourth lens element 340 have at least one inflection point.

The fifth lens element 350 with positive refractive power has a convex object-side surface 351 and a concave image-side surface 352, which are both aspheric, and the fifth lens element 350 is made of plastic material. Moreover, both of the object-side surface 351 and the image-side surface 352 of the fifth lens element 350 have at least one inflection point.

The IR-cut filter 370 is made of glass and located between the fifth lens element 350 and the image plane 360, and will not affect the focal length of the imaging lens assembly.

The detailed optical data of the 3rd embodiment are shown in Table 5 and the aspheric surface data are shown in Table 6 below.

TABLE 5

3rd Embodiment
f = 3.33 mm, Fno = 2.20, HFOV = 40.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.179 | | | | |

TABLE 5-continued

3rd Embodiment
f = 3.33 mm, Fno = 2.20, HFOV = 40.0 deg.

| Surface # | | Curvature Radius | | Thickness | Material | Index | Abbe # | Focal Length |
|---|---|---|---|---|---|---|---|---|
| 2 | Lens 1 | 1.644 | ASP | 0.443 | Plastic | 1.572 | 56.0 | 6.62 |
| 3 | | 2.620 | ASP | 0.093 | | | | |
| 4 | Lens 2 | 1.974 | ASP | 0.341 | Plastic | 1.572 | 56.0 | 14.35 |
| 5 | | 2.435 | ASP | 0.287 | | | | |
| 6 | Lens 3 | −738.441 | ASP | 0.432 | Plastic | 1.572 | 56.0 | 6.98 |
| 7 | | −3.971 | ASP | 0.426 | | | | |
| 8 | Lens 4 | −6.112 | ASP | 0.496 | Plastic | 1.650 | 21.4 | −6.09 |
| 9 | | 11.595 | ASP | 0.050 | | | | |
| 10 | Lens 5 | 1.685 | ASP | 0.978 | Plastic | 1.544 | 55.9 | 43.60 |
| 11 | | 1.442 | ASP | 0.400 | | | | |
| 12 | IR-cut filter | Plano | | 0.200 | Glass | 1.517 | 64.2 | — |
| 13 | | Plano | | 0.168 | | | | |
| 14 | Image | Plano | | — | | | | |

Note:
Reference wavelength is 587.6 nm (d-line).

TABLE 6

Aspheric Coefficients

| | Surface # | | | | |
|---|---|---|---|---|---|
| | 2 | 3 | 4 | 5 | 6 |
| k = | −1.4173E−01 | −2.1717E+01 | −1.8679E+00 | −1.3934E+00 | −3.0000E+01 |
| A4 = | −1.4759E−02 | −3.8527E−02 | −2.3609E−01 | −8.5611E−02 | −2.6367E−02 |
| A6 = | 7.8618E−02 | −1.1428E−01 | −5.4602E−02 | −1.7608E−01 | −2.0196E−01 |
| A8 = | −1.9308E−01 | 7.1873E−01 | 5.9004E−01 | 2.2556E−01 | −2.4407E−01 |
| A10 = | 3.3018E−01 | −1.4257E+00 | −1.1536E+00 | −7.7817E−02 | 2.0590E+00 |
| A12 = | −2.8297E−01 | 1.3391E+00 | 1.0406E+00 | −2.7377E−01 | −5.0196E+00 |
| A14 = | 1.4322E−01 | −2.0797E−01 | −2.0970E−01 | 2.4070E−01 | 5.3150E+00 |
| A16 = | −6.9051E−07 | 1.0587E−06 | −1.0539E−06 | 4.4987E−06 | −1.9761E+00 |

| | Surface # | | | | |
|---|---|---|---|---|---|
| | 7 | 8 | 9 | 10 | 11 |
| k = | −3.0000E+01 | 5.0000E+00 | −3.0000E+01 | −1.2604E+00 | −2.7100E+00 |
| A4 = | −5.8584E−02 | 2.8145E−01 | 8.3982E−02 | −3.4077E−01 | −1.5331E−01 |
| A6 = | −8.2091E−02 | −6.2529E−01 | −1.5592E−01 | 2.0024E−01 | 8.6000E−02 |
| A8 = | −5.8696E−01 | 5.7068E−01 | 9.2561E−02 | −7.1880E−02 | −3.8494E−02 |
| A10 = | 1.9152E+00 | −4.1301E−01 | −3.8724E−02 | 1.6736E−02 | 1.1320E−02 |
| A12 = | −2.6556E+00 | 1.5241E−01 | 1.2083E−02 | −2.4289E−03 | −1.9603E−03 |
| A14 = | 1.7546E+00 | −2.5786E−02 | −2.1757E−03 | 1.9959E−04 | 1.7955E−04 |
| A16 = | −3.8926E−01 | 5.9081E−03 | 1.5739E−04 | −7.1869E−06 | −6.7015E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following relationships:

| 3rd Embodiment | | | |
|---|---|---|---|
| f [mm] | 3.33 | |R1/R2| | 0.63 |
| Fno | 2.20 | (R4 + R5)/(R4 − R5) | −0.99 |
| HFOV [deg.] | 40.0 | f1/f2 | 0.46 |
| V4 | 21.4 | (f1 + f2)/(f1 − f2) | −2.71 |
| f/EPD | 2.20 | |f/f2| + |f/f3| + |f/f4| + |f/f5| | 1.33 |
| CT5/CT2 | 2.87 | Yc42/Yc52 | 0.64 |
| T34/CT4 | 0.86 | DI/TL | 1.32 |

4th Embodiment

Figure 7:
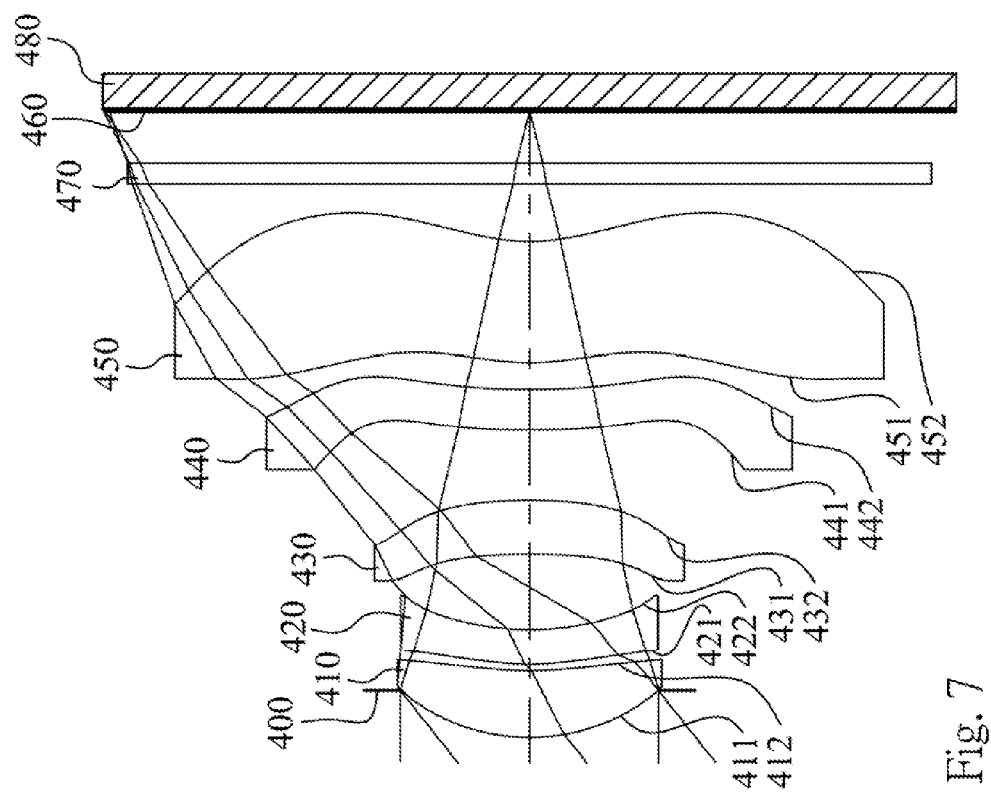
FIG. 7 is a schematic view of an imaging lens assembly according to the 4th embodiment of the present disclosure.
Figure 8:
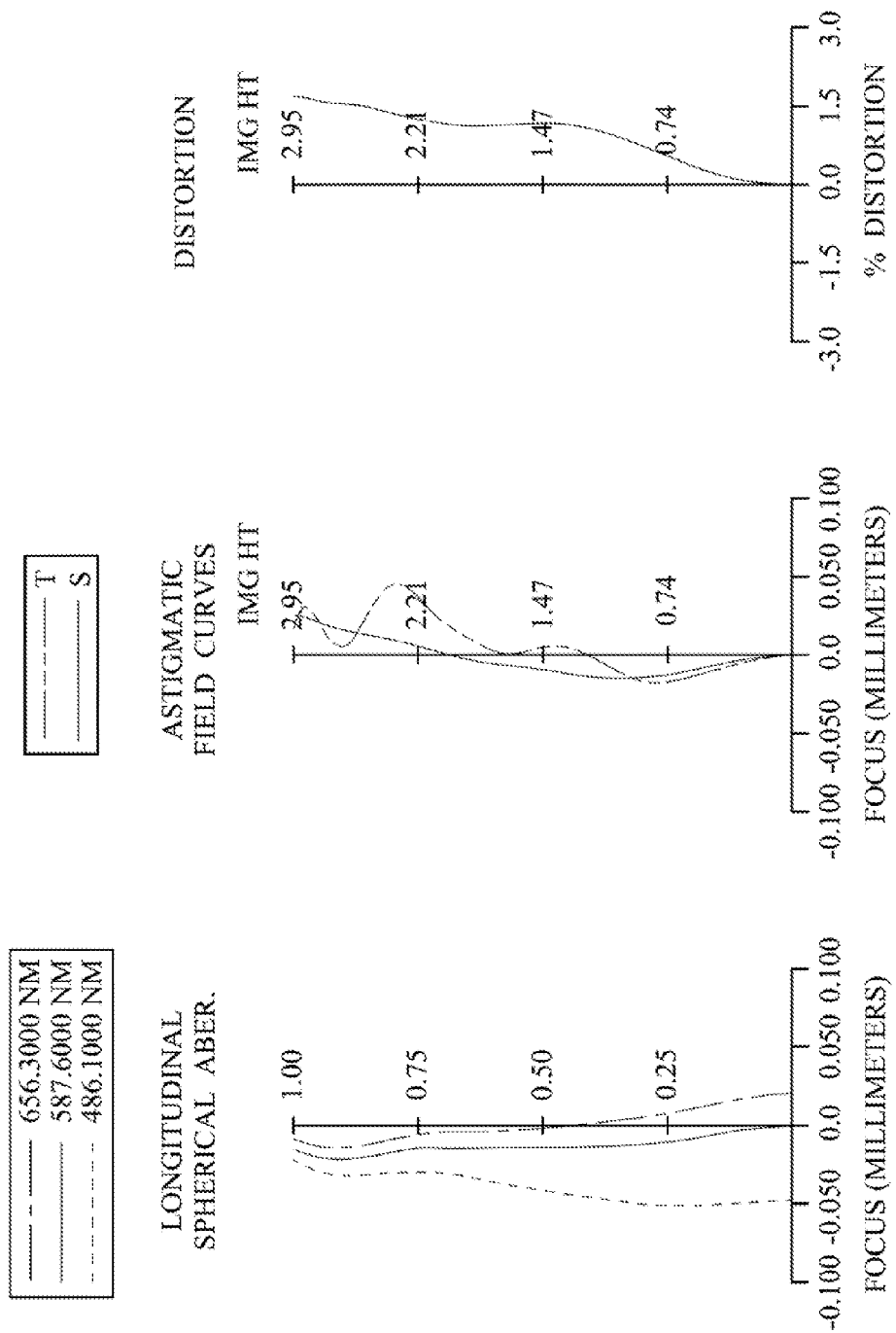
FIG. 8 shows, in order from left to right, spherical aberration curves, astigmatic field curves and a distortion curve of the imaging lens assembly according to the 4th embodiment.

FIG. 7 is a schematic view of an imaging lens assembly according to the 4th embodiment of the present disclosure. FIG. 8 shows, in order from left to right, spherical aberration curves, astigmatic field curves and a distortion curve of the imaging lens assembly according to the 4th embodiment.

In FIG. 7, the imaging lens assembly includes five lens elements with refractive power, in order from an object side to an image side, an aperture stop 400, a first lens element 410, a second lens element 420, a third lens element 430, a fourth lens element 440, a fifth lens element 450, an IR-cut filter 470, an image plane 460 and an image sensor 480.

The first lens element 410 with positive refractive power has a convex object-side surface 411 and a concave image-side surface 412, which are both aspheric, and the first lens element 410 is made of plastic material.

The second lens element 420 with positive refractive power has a convex object-side surface 421 and a concave image-side surface 422, which are both aspheric, and the second lens element 420 is made of plastic material.

The third lens element 430 with positive refractive power has a concave object-side surface 431 and a convex image-side surface 432, which are both aspheric, and the third lens element 430 is made of plastic material.

The fourth lens element 440 with negative refractive power has a convex object-side surface 441 and a concave image-side surface 442, which are both aspheric, and the fourth lens element 440 is made of plastic material. Moreover, both of the object-side surface 441 and the image-side surface 442 of the fourth lens element 440 have at least one inflection point.

The fifth lens element 450 with negative refractive power has a convex object-side surface 451 and a concave image-side surface 452, which are both aspheric, and the fifth lens element 450 is made of plastic material. Moreover, both of the object-side surface 451 and the image-side surface 452 of the fifth lens element 450 have at least one inflection point.

The IR-cut filter 470 is made of glass and located between the fifth lens element 450 and the image plane 460, and will not affect the focal length of the imaging lens assembly.

The detailed optical data of the 4th embodiment are shown in Table 7 and the aspheric surface data are shown in Table 8 below.

TABLE 7

4th Embodiment
f = 3.66 mm, Fno = 2.05, HFOV = 38.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.322 | | | | |
| 2 | Lens 1 | 1.424 ASP | 0.457 | Plastic | 1.572 | 56.5 | 5.81 |
| 3 | | 2.200 ASP | 0.044 | | | | |
| 4 | Lens 2 | 1.705 ASP | 0.244 | Plastic | 1.639 | 23.5 | 22.00 |
| 5 | | 1.832 ASP | 0.518 | | | | |
| 6 | Lens 3 | −5.434 ASP | 0.378 | Plastic | 1.544 | 55.9 | 17.38 |
| 7 | | −3.536 ASP | 0.487 | | | | |
| 8 | Lens 4 | 18.942 ASP | 0.282 | Plastic | 1.639 | 23.5 | −21.23 |
| 9 | | 7.859 ASP | 0.184 | | | | |
| 10 | Lens 5 | 1.727 ASP | 0.837 | Plastic | 1.535 | 55.7 | −64.45 |
| 11 | | 1.367 ASP | 0.400 | | | | |
| 12 | IR-cut filter | Plano | 0.145 | Glass | 1.517 | 64.2 | — |
| 13 | | Plano | 0.366 | | | | |
| 14 | Image | Plano | — | | | | |

Note:
Reference wavelength is 587.6 nm (d-line).

TABLE 8

Aspheric Coefficients

| | Surface # | | | | |
|---|---|---|---|---|---|
| | 2 | 3 | 4 | 5 | 6 |
| k = | 2.8479E−02 | −3.0000E+01 | −9.3291E+00 | −1.5528E+00 | −7.9225E−01 |
| A4 = | −8.1841E−03 | −1.0481E−01 | −2.4529E−01 | −5.3452E−02 | −9.7504E−02 |
| A6 = | 9.9546E−02 | −1.1432E−01 | 5.2490E−02 | −3.1819E−03 | −2.0690E−01 |
| A8 = | −2.3576E−01 | 8.0771E−01 | 7.0136E−01 | 3.1605E−01 | −1.7152E−01 |
| A10 = | 3.2495E−01 | −1.3801E+00 | −1.1822E+00 | −4.2340E−02 | 2.0897E+00 |
| A12 = | −1.9965E−01 | 1.2194E+00 | 9.5751E−01 | −3.1329E−01 | −5.0448E+00 |
| A14 = | 4.0298E−02 | −4.8656E−01 | −3.9590E−01 | 3.0965E−01 | 5.2751E+00 |
| A16 = | 7.1664E−03 | −8.0148E−03 | −1.3886E−02 | −4.5099E−02 | −1.9254E+00 |

| | Surface # | | | | |
|---|---|---|---|---|---|
| | 7 | 8 | 9 | 10 | 11 |
| k = | −1.4888E+01 | −2.5971E+00 | −6.1354E+00 | −3.9570E+00 | −4.1153E+00 |
| A4 = | −1.1243E−01 | 3.3493E−01 | 1.4094E−01 | −3.2816E−01 | −1.5222E−01 |
| A6 = | −8.0189E−02 | −6.1619E−01 | −1.8482E−01 | 2.0140E−01 | 8.4598E−02 |
| A8 = | −5.6278E−01 | 5.8315E−01 | 9.2334E−02 | −7.2049E−02 | −3.8379E−02 |
| A10 = | 1.9203E+00 | −3.9327E−01 | −3.7962E−02 | 1.6719E−02 | 1.1309E−02 |
| A12 = | −2.6585E+00 | 1.5498E−01 | 1.2217E−02 | −2.4306E−03 | −1.9639E−03 |
| A14 = | 1.7441E+00 | −3.0651E−02 | −2.1742E−03 | 1.9968E−04 | 1.7957E−04 |
| A16 = | −4.1766E−01 | 2.3607E−03 | 1.5016E−04 | −7.0451E−06 | −6.5937E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following relationships:

| 4th Embodiment | | | |
|---|---|---|---|
| f [mm] | 3.66 | |R1/R2| | 0.65 |
| Fno | 2.05 | (R4 + R5)/(R4 − R5) | −0.50 |
| HFOV [deg.] | 38.4 | f1/f2 | 0.26 |
| V4 | 23.5 | (f1 + f2)/(f1 − f2) | −1.72 |
| f/EPD | 2.05 | |f/f2| + |f/f3| + |f/f4| + |f/f5| | 0.61 |
| CT5/CT2 | 3.43 | Yc42/Yc52 | 0.86 |
| T34/CT4 | 1.73 | DI/TL | 1.36 |

5th Embodiment

Figure 9:
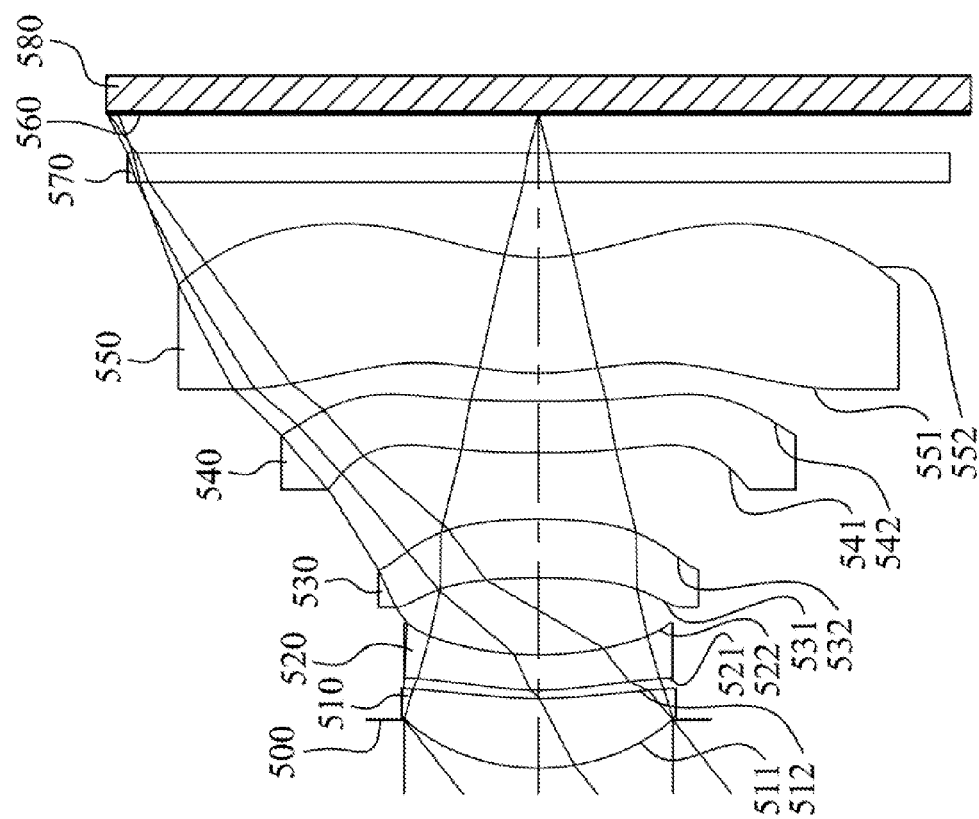
FIG. 9 is a schematic view of an imaging lens assembly according to the 5th embodiment of the present disclosure.
Figure 10:
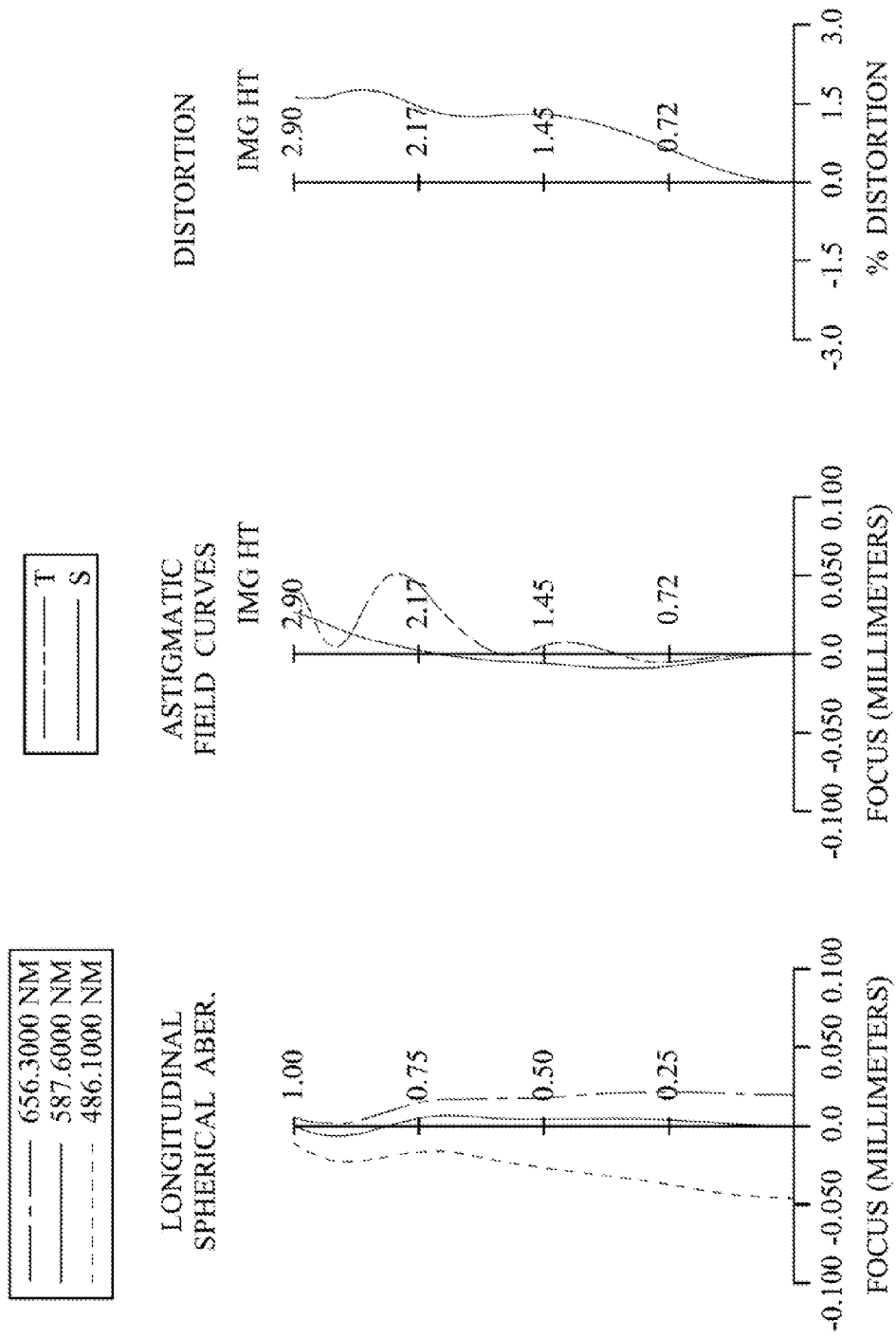
FIG. 10 shows, in order from left to right, spherical aberration curves, astigmatic field curves and a distortion curve of the imaging lens assembly according to the 5th embodiment.

FIG. 9 is a schematic view of an imaging lens assembly according to the 5th embodiment of the present disclosure. FIG. 10 shows, in order from left to right, spherical aberration curves, astigmatic field curves and a distortion curve of the imaging lens assembly according to the 5th embodiment.

In FIG. 9, the imaging lens assembly includes five lens elements with refractive power, in order from an object side to an image side, an aperture stop 500, a first lens element 510, a second lens element 520, a third lens element 530, a fourth lens element 540, a fifth lens element 550, an IR-cut filter 570, an image plane 560 and an image sensor 580.

The first lens element 510 with positive refractive power has a convex object-side surface 511 and a concave image-side surface 512, which are both aspheric, and the first lens element 510 is made of plastic material.

The second lens element 520 with positive refractive power has a convex object-side surface 521 and a concave image-side surface 522, which are both aspheric, and the second lens element 520 is made of plastic material.

The third lens element 530 with positive refractive power has a concave object-side surface 531 and a convex image-side surface 532, which are both aspheric, and the third lens element 530 is made of plastic material.

The fourth lens element 540 with positive refractive power has a convex object-side surface 541 and a concave image-side surface 542, which are both aspheric, and the fourth lens element 540 is made of plastic material. Moreover, both of the object-side surface 541 and the image-side surface 542 of the fourth lens element 540 have at least one inflection point.

The fifth lens element 550 with negative refractive power has a convex object-side surface 551 and a concave image-side surface 552, which are both aspheric, and the fifth lens element 550 is made of plastic material. Moreover, both of the object-side surface 551 and the image-side surface 552 of the fifth lens element 550 have at least one inflection point.

The IR-cut filter 570 is made of glass and located between the fifth lens element 550 and the image plane 560, and will not affect the focal length of the imaging lens assembly.

The detailed optical data of the 5th embodiment are shown in Table 9 and the aspheric surface data are shown in Table 10 below.

TABLE 9

5th Embodiment
f = 3.60 mm, Fno = 2.00, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.324 | | | | |
| 2 | Lens 1 | 1.446 | ASP | 0.467 | Plastic | 1.544 | 55.9 | 5.33 |
| 3 | | 2.557 | ASP | 0.056 | | | | |
| 4 | Lens 2 | 1.974 | ASP | 0.237 | Plastic | 1.632 | 23.4 | 34.07 |
| 5 | | 2.073 | ASP | 0.517 | | | | |
| 6 | Lens 3 | −4.918 | ASP | 0.390 | Plastic | 1.544 | 55.9 | 22.19 |
| 7 | | −3.593 | ASP | 0.450 | | | | |
| 8 | Lens 4 | 16.030 | ASP | 0.342 | Plastic | 1.614 | 25.6 | 85.93 |
| 9 | | 22.835 | ASP | 0.191 | | | | |
| 10 | Lens 5 | 1.818 | ASP | 0.775 | Plastic | 1.544 | 55.9 | −15.33 |
| 11 | | 1.269 | ASP | 0.500 | | | | |
| 12 | IR-cut filter | Plano | | 0.200 | Glass | 1.517 | 64.2 | — |
| 13 | | Plano | | 0.271 | | | | |
| 14 | Image | Plano | | — | | | | |

Note:
Reference wavelength is 587.6 nm (d-line).

TABLE 10

Aspheric Coefficients

| Surface # | 2 | 3 | 4 | 5 | 6 |
|---|---|---|---|---|---|
| k = | 3.4857E−02 | −3.0000E+01 | −8.1362E+00 | −2.4616E+00 | 4.3945E+00 |
| A4 = | −9.2006E−03 | −9.8419E−02 | −2.4576E−01 | −6.0867E−02 | −1.1634E−01 |
| A6 = | 9.8960E−02 | −1.0748E−01 | 2.9060E−02 | −9.6210E−03 | −1.6454E−01 |
| A8 = | −2.3030E−01 | 7.7178E−01 | 6.9202E−01 | 3.0979E−01 | −2.2245E−01 |
| A10 = | 3.2098E−01 | −1.3847E+00 | −1.1664E+00 | −7.0834E−02 | 2.1155E+00 |
| A12 = | −1.9821E−01 | 1.2548E+00 | 9.5959E−01 | −2.6643E−01 | −5.0342E+00 |
| A14 = | 5.0767E−02 | −4.6709E−01 | −4.0357E−01 | 2.2790E−01 | 5.2589E+00 |
| A16 = | −4.7575E−03 | −5.2672E−02 | −1.9694E−02 | −5.1840E−10 | −1.9310E+00 |

| Surface # | 7 | 8 | 9 | 10 | 11 |
|---|---|---|---|---|---|
| k = | 7.2586E−01 | 4.2862E+00 | 5.0000E+00 | −2.4143E+00 | −4.0728E+00 |
| A4 = | −1.0020E−01 | 2.7834E−01 | 1.4014E−01 | −3.3964E−01 | −1.4930E−01 |
| A6 = | −8.7187E−02 | −5.5744E−01 | −1.8074E−01 | 2.0226E−01 | 8.6320E−02 |
| A8 = | −5.4538E−01 | 5.4027E−01 | 9.1521E−02 | −7.1940E−02 | −3.8714E−02 |
| A10 = | 1.9145E+00 | −3.8024E−01 | −3.8050E−02 | 1.6715E−02 | 1.1317E−02 |
| A12 = | −2.6651E+00 | 1.5761E−01 | 1.2254E−02 | −2.4320E−03 | −1.9606E−03 |
| A14 = | 1.7422E+00 | −3.2009E−02 | −2.1605E−03 | 1.9959E−04 | 1.7964E−04 |
| A16 = | −4.1555E−01 | 2.1949E−03 | 1.4392E−04 | −7.0364E−06 | −6.6520E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following relationships:

| 5th Embodiment | | | |
|---|---|---|---|
| f [mm] | 3.60 | |R1/R2| | 0.57 |
| Fno | 2.00 | (R4 + R5)/(R4 − R5) | −0.41 |
| HFOV [deg.] | 38.3 | f1/f2 | 0.16 |
| V4 | 25.6 | (f1 + f2)/(f1 − f2) | −1.37 |
| f/EPD | 2.00 | |f/f2| + |f/f3| + |f/f4| + |f/f5| | 0.54 |
| CT5/CT2 | 3.27 | Yc42/Yc52 | 0.74 |
| T34/CT4 | 1.32 | Dl/TL | 1.32 |

6th Embodiment

Figure 11:
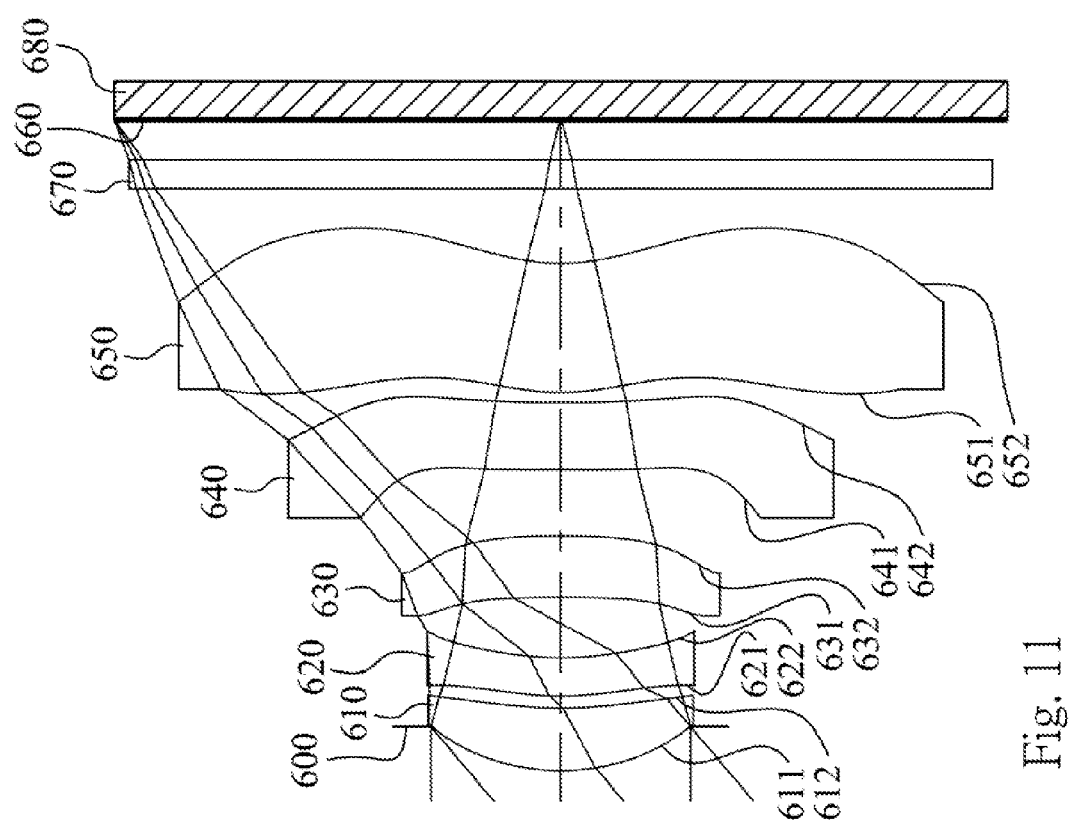
FIG. 11 is a schematic view of an imaging lens assembly according to the 6th embodiment of the present disclosure.
Figure 12:
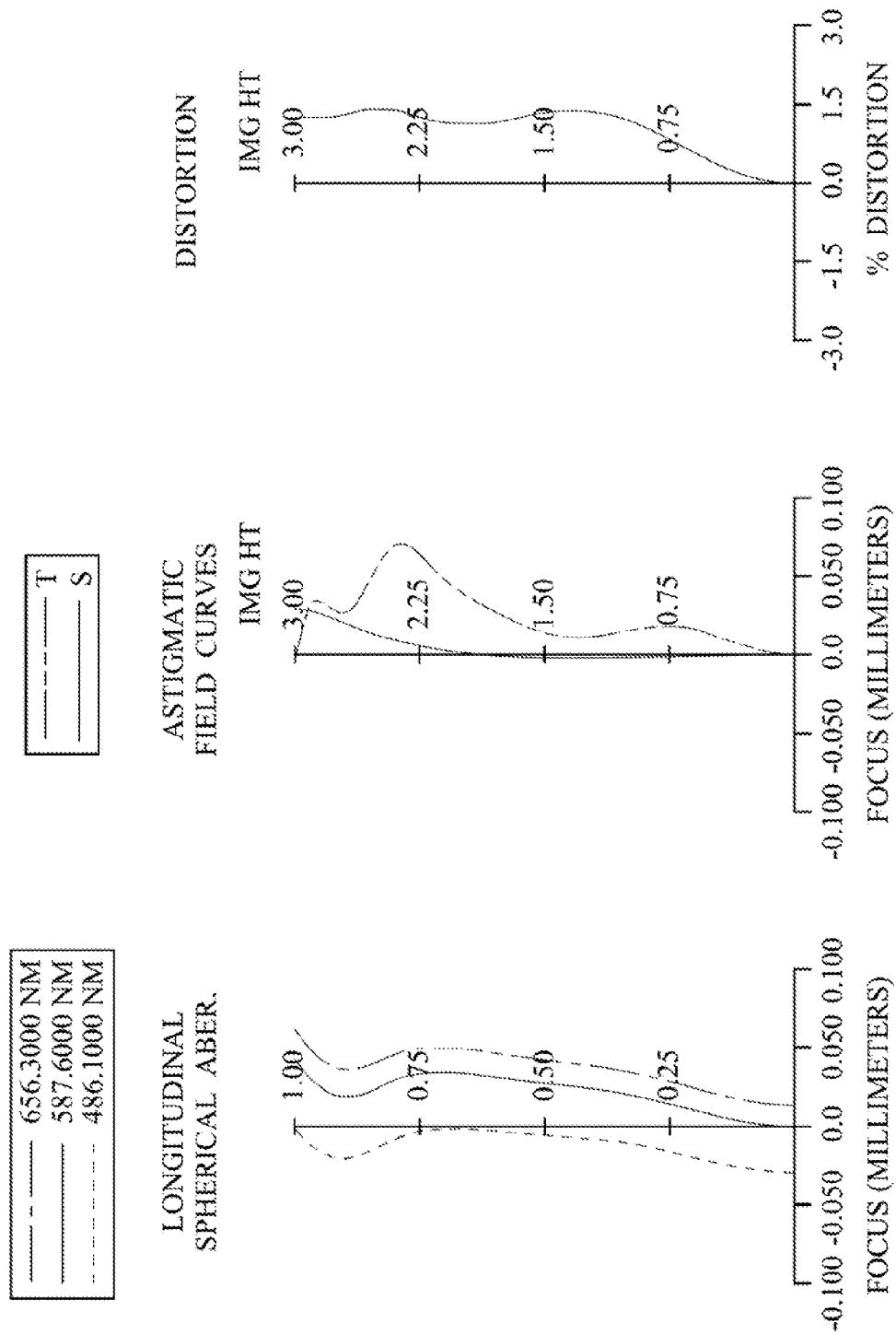
FIG. 12 shows, in order from left to right, spherical aberration curves, astigmatic field curves and a distortion curve of the imaging lens assembly according to the 6th embodiment.

FIG. 11 is a schematic view of an imaging lens assembly according to the 6th embodiment of the present disclosure. FIG. 12 shows, in order from left to right, spherical aberration curves, astigmatic field curves and a distortion curve of the imaging lens assembly according to the 6th embodiment.

In FIG. 11, the imaging lens assembly includes five lens elements with refractive power, in order from an object side to an image side, an aperture stop 600, a first lens element 610, a second lens element 620, a third lens element 630, a fourth lens element 640, a fifth lens element 650, an IR-cut filter 670, an image plane 660 and an image sensor 680.

The first lens element 610 with positive refractive power has a convex object-side surface 611 and a concave image-side surface 612, which are both aspheric, and the first lens element 610 is made of plastic material.

The second lens element 620 with positive refractive power has a convex object-side surface 621 and a concave image-side surface 622, which are both aspheric, and the second lens element 620 is made of plastic material.

The third lens element 630 with positive refractive power has a concave object-side surface 631 and a convex image-side surface 632, which are both aspheric, and the third lens element 630 is made of plastic material.

The fourth lens element 640 with negative refractive power has a concave object-side surface 641 and a concave image-side surface 642, which are both aspheric, and the fourth lens element 640 is made of plastic material. Moreover, both of the object-side surface 641 and the image-side surface 642 of the fourth lens element 640 have at least one inflection point.

The fifth lens element 650 with positive refractive power has a convex object-side surface 651 and a concave image-side surface 652, which are both aspheric, and the fifth lens element 650 is made of plastic material. Moreover, both of the object-side surface 651 and the image-side surface 652 of the fifth lens element 650 have at least one inflection point.

The IR-cut filter 670 is made of glass and located between the fifth lens element 650 and the image plane 660, and will not affect the focal length of the imaging lens assembly.

The detailed optical data of the 6th embodiment are shown in Table 11 and the aspheric surface data are shown in Table 12 below.

TABLE 11

6th Embodiment
f = 3.49 mm, Fno = 2.00, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.295 | | | | |
| 2 | Lens 1 | 1.462 | ASP | 0.420 | Plastic | 1.544 | 55.9 | 5.54 |
| 3 | | 2.554 | ASP | 0.082 | | | | |
| 4 | Lens 2 | 1.936 | ASP | 0.254 | Plastic | 1.543 | 56.5 | 26.97 |
| 5 | | 2.127 | ASP | 0.410 | | | | |
| 6 | Lens 3 | −14.286 | ASP | 0.411 | Plastic | 1.535 | 56.3 | 15.02 |
| 7 | | −5.192 | ASP | 0.450 | | | | |
| 8 | Lens 4 | −15.278 | ASP | 0.449 | Plastic | 1.650 | 21.4 | −14.02 |
| 9 | | 22.835 | ASP | 0.070 | | | | |
| 10 | Lens 5 | 1.533 | ASP | 0.868 | Plastic | 1.514 | 56.8 | 44.87 |
| 11 | | 1.327 | ASP | 0.500 | | | | |
| 12 | IR-cut filter | Plano | | 0.200 | Glass | 1.517 | 64.2 | — |
| 13 | | Plano | | 0.268 | | | | |
| 14 | Image | Plano | | — | | | | |

Note:
Reference wavelength is 587.6 nm (d-line).

TABLE 12

Aspheric Coefficients

| Surface # | | | | | |
|---|---|---|---|---|---|
| | 2 | 3 | 4 | 5 | 6 |
| k = | 1.6272E−03 | −2.1451E+01 | −3.7302E+00 | −2.2728E+00 | −3.0000E+01 |
| A4 = | −1.7031E−02 | −5.9872E−02 | −2.6799E−01 | −8.0444E−02 | −9.4773E−02 |
| A6 = | 1.0273E−01 | −1.2638E−01 | −2.8494E−02 | −7.1420E−02 | −1.5310E−01 |
| A8 = | −2.1969E−01 | 7.2192E−01 | 6.6640E−01 | 3.0023E−01 | −2.4352E−01 |
| A10 = | 3.1823E−01 | −1.3816E+00 | −1.1377E+00 | −5.1386E−02 | 2.1183E+00 |
| A12 = | −2.1195E−01 | 1.2932E+00 | 1.0077E+00 | −2.2216E−01 | −5.0178E+00 |
| A14 = | 4.5107E−02 | −4.3628E−01 | −3.9086E−01 | 2.2374E−01 | 5.2532E+00 |
| A16 = | 2.0314E−02 | −5.6936E−02 | −4.6945E−02 | −3.7980E−02 | −1.9518E+00 |

| Surface # | | | | | |
|---|---|---|---|---|---|
| | 7 | 8 | 9 | 10 | 11 |
| k = | −3.0000E+01 | 5.0000E+00 | 5.0000E+00 | −2.0711E+00 | −3.1575E+00 |
| A4 = | −8.2150E−02 | 3.0409E−01 | 1.2139E−01 | −3.4326E−01 | −1.5670E−01 |
| A6 = | −1.1057E−01 | −5.8270E−01 | −1.6977E−01 | 2.0245E−01 | 8.7422E−02 |
| A8 = | −5.4047E−01 | 5.3778E−01 | 9.1890E−02 | −7.1891E−02 | −3.8677E−02 |
| A10 = | 1.9159E+00 | −3.8275E−01 | −3.8529E−02 | 1.6710E−02 | 1.1309E−02 |
| A12 = | −2.6657E+00 | 1.5884E−01 | 1.2161E−02 | −2.4323E−03 | −1.9616E−03 |
| A14 = | 1.7428E+00 | −3.1220E−02 | −2.1565E−03 | 1.9959E−04 | 1.7963E−04 |
| A16 = | −4.1188E−01 | 2.2208E−03 | 1.5115E−04 | −7.0295E−06 | −6.6401E−06 |

In the 6th embodiment, the equation of the aspheric surface profiles of the aforementioned lens elements is the same as the equation of the $1^{st}$ embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following relationships:

| 6th Embodiment | | | |
|---|---|---|---|
| f [mm] | 3.49 | |R1/R2| | 0.57 |
| Fno | 2.00 | (R4 + R5)/(R4 − R5) | −0.74 |
| HFOV [deg.] | 40.2 | f1/f2 | 0.21 |
| V4 | 21.4 | (f1 + f2)/(f1 − f2) | −1.52 |
| f/EPD | 2.00 | |f/f2| + |f/f3| + |f/f4| + |f/f5| | 0.69 |
| CT5/CT2 | 3.42 | Yc42/Yc52 | 0.71 |
| T34/CT4 | 1.00 | DI/TL | 1.37 |

7th Embodiment

Figure 13:
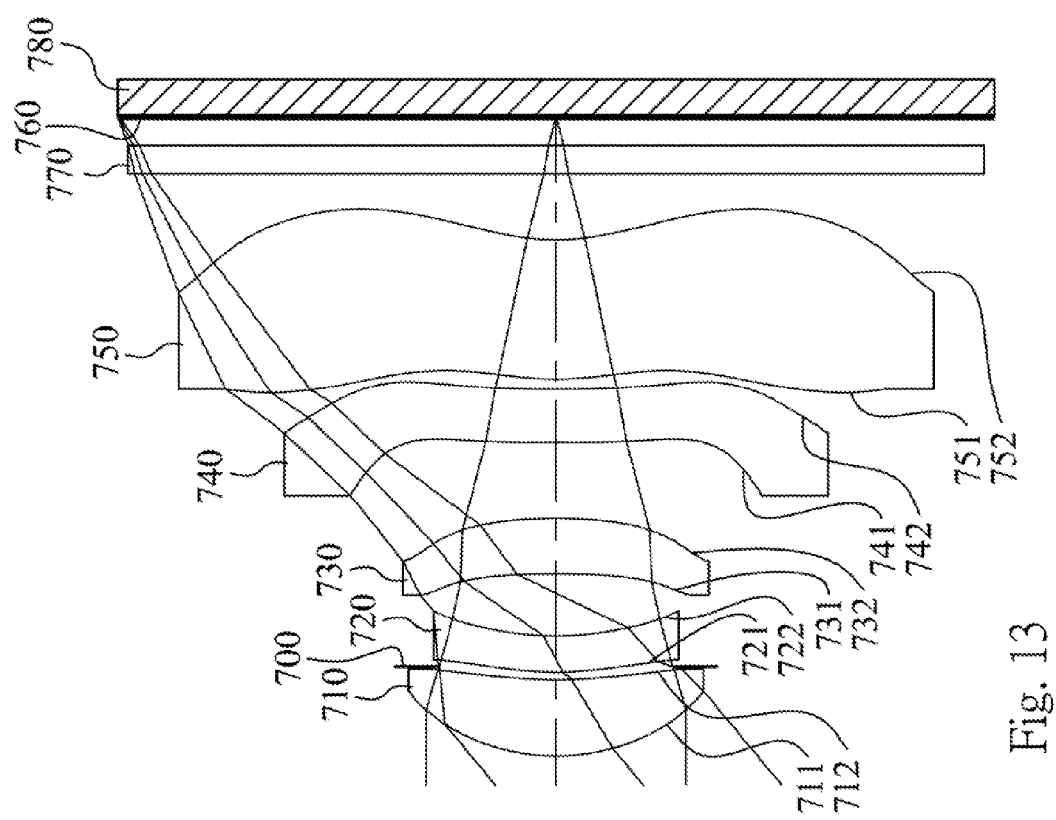
FIG. 13 is a schematic view of an imaging lens assembly according to the 7th embodiment of the present disclosure.
Figure 14:
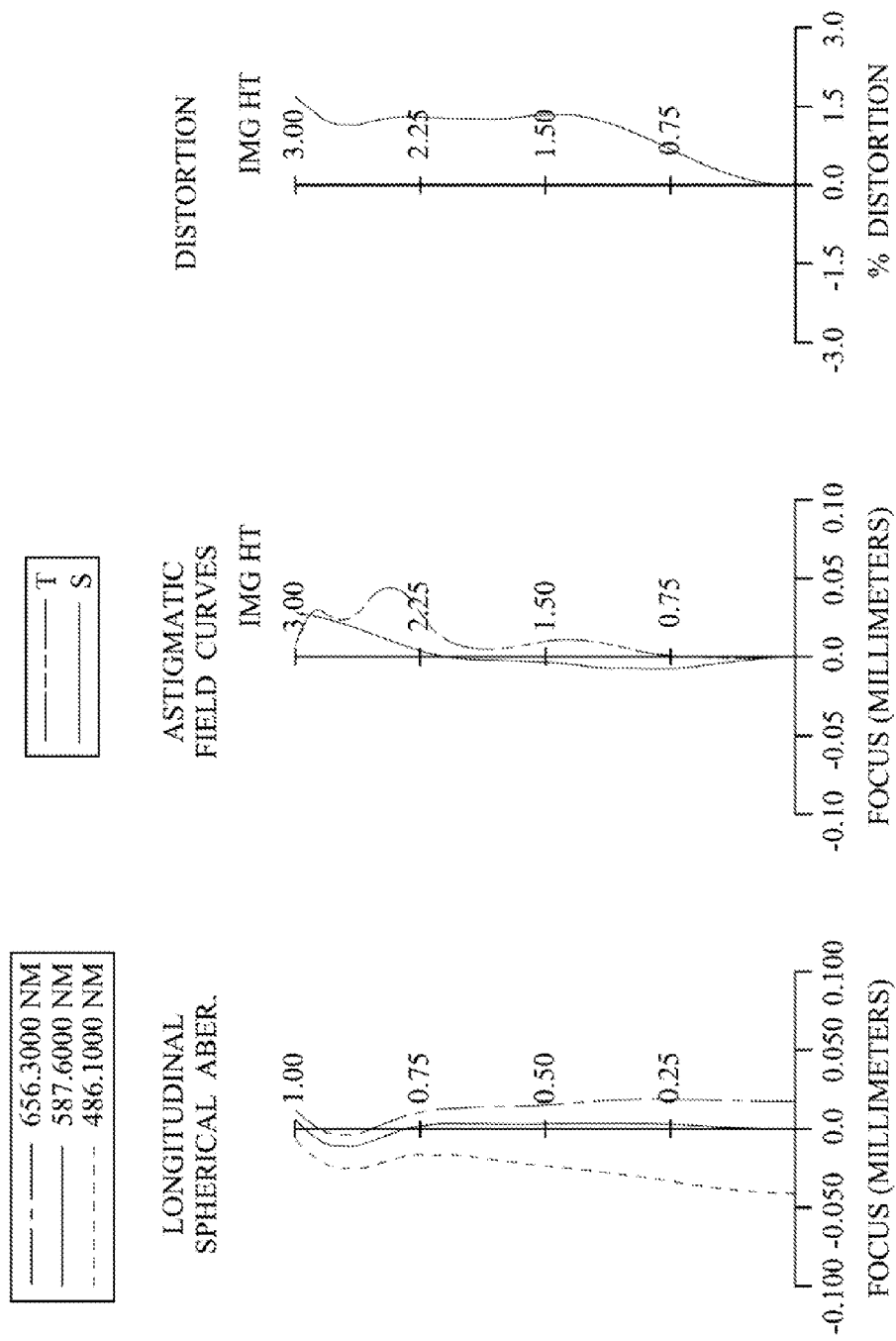
FIG. 14 shows, in order from left to right, spherical aberration curves, astigmatic field curves and a distortion curve of the imaging lens assembly according to the 7th embodiment.

FIG. 13 is a schematic view of an imaging lens assembly according to the 7th embodiment of the present disclosure. FIG. 14 shows, in order from left to right, spherical aberration curves, astigmatic field curves and a distortion curve of the imaging lens assembly according to the 7th embodiment.

In FIG. 13, the imaging lens assembly includes five lens elements with refractive power, in order from an object side to an image side, a first lens element 710, an aperture stop 700, a second lens element 720, a third lens element 730, a fourth lens element 740, a fifth lens element 750, an IR-cut filter 770, an image plane 760 and an image sensor 780.

The first lens element 710 with positive refractive power has a convex object-side surface 711 and a concave image-side surface 712, which are both aspheric, and the first lens element 710 is made of plastic material.

The second lens element 720 with positive refractive power has a convex object-side surface 721 and a concave image-side surface 722, which are both aspheric, and the second lens element 720 is made of plastic material.

The third lens element 730 with positive refractive power has a concave object-side surface 731 and a convex image-side surface 732, which are both aspheric, and the third lens element 730 is made of plastic material.

The fourth lens element 740 with negative refractive power has a concave object-side surface 741 and a concave image-side surface 742, which are both aspheric, and the fourth lens element 740 is made of plastic material. Moreover, the image-side surface 742 of the fourth lens element 740 has at least one inflection point.

The fifth lens element 750 with negative refractive power has a convex object-side surface 751 and a concave image-side surface 752, which are both aspheric, and the fifth lens element 750 is made of plastic material. Moreover, both of the object-side surface 751 and the image-side surface 752 of the fifth lens element 750 have at least one inflection point.

The IR-cut filter 770 is made of glass and located between the fifth lens element 750 and the image plane 760, and will not affect the focal length of the imaging lens assembly.

The detailed optical data of the 7th embodiment are shown in Table 13 and the aspheric surface data are shown in Table 14 below.

TABLE 13

7th Embodiment
f = 3.56 mm, Fno = 2.00, HFOV = 39.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.463 | ASP | 0.522 | Plastic | 1.543 | 56.5 | 5.36 |
| 2 | | 2.571 | ASP | 0.092 | | | | |
| 3 | Ape. Stop | Plano | | −0.040 | | | | |
| 4 | Lens 2 | 1.920 | ASP | 0.245 | Plastic | 1.640 | 23.3 | 33.68 |
| 5 | | 2.002 | ASP | 0.430 | | | | |
| 6 | Lens 3 | −7.289 | ASP | 0.377 | Plastic | 1.544 | 55.9 | 11.68 |
| 7 | | −3.457 | ASP | 0.526 | | | | |
| 8 | Lens 4 | −20.744 | ASP | 0.362 | Plastic | 1.614 | 25.6 | −14.67 |
| 9 | | 16.031 | ASP | 0.070 | | | | |
| 10 | Lens 5 | 2.002 | ASP | 0.956 | Plastic | 1.544 | 55.9 | −35.26 |
| 11 | | 1.508 | ASP | 0.450 | | | | |
| 12 | IR-cut filter | Plano | | 0.200 | Glass | 1.517 | 64.2 | — |
| 13 | | Plano | | 0.193 | | | | |
| 14 | Image | Plano | | — | | | | |

Note:
Reference wavelength is 587.6 nm (d-line).

TABLE 14

Aspheric Coefficients

| | Surface # | | | | |
|---|---|---|---|---|---|
| | 1 | 2 | 4 | 5 | 6 |
| k = | −3.3892E−03 | −3.0000E+01 | −8.1468E+00 | −1.9941E+00 | −1.4767E+01 |
| A4 = | −8.1325E−03 | −9.9656E−02 | −2.2497E−01 | −6.0058E−02 | −9.0219E−02 |
| A6 = | 9.1263E−02 | −7.3385E−02 | 3.2347E−02 | −1.7403E−02 | −1.7383E−01 |
| A8 = | −2.1414E−01 | 7.5846E−01 | 6.6094E−01 | 2.7069E−01 | −2.2241E−01 |
| A10 = | 3.2029E−01 | −1.4211E+00 | −1.1921E+00 | −9.4010E−02 | 2.1177E+00 |
| A12 = | −2.2055E−01 | 1.2591E+00 | 9.7593E−01 | −1.7265E−01 | −5.0416E+00 |
| A14 = | 4.3839E−02 | −4.4040E−01 | −3.3986E−01 | 1.6754E−01 | 5.2256E+00 |
| A16 = | 2.3345E−02 | −8.6199E−03 | −3.0375E−02 | −4.5365E−10 | −1.8872E+00 |

| | Surface # | | | | |
|---|---|---|---|---|---|
| | 7 | 8 | 9 | 10 | 11 |
| k = | −7.1288E+00 | −3.0000E+01 | −9.9567E−01 | −2.4829E+00 | −3.2763E+00 |
| A4 = | −9.0920E−02 | 3.0849E−01 | 1.2123E−01 | −3.3028E−01 | −1.5022E−01 |
| A6 = | −6.4426E−02 | −5.7413E−01 | −1.6223E−01 | 2.0134E−01 | 8.5475E−02 |
| A8 = | −5.7845E−01 | 5.4682E−01 | 8.6654E−02 | −7.2059E−02 | −3.8586E−02 |
| A10 = | 1.9204E+00 | −3.8122E−01 | −3.8279E−02 | 1.6718E−02 | 1.1330E−02 |
| A12 = | −2.6704E+00 | 1.5436E−01 | 1.2370E−02 | −2.4300E−03 | −1.9635E−03 |
| A14 = | 1.7421E+00 | −3.1792E−02 | −2.1491E−03 | 1.9987E−04 | 1.7934E−04 |
| A16 = | −4.0295E−01 | 2.6307E−03 | 1.4402E−04 | −7.0845E−06 | −6.5990E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following relationships:

| 7th Embodiment | | | |
|---|---|---|---|
| f [mm] | 3.56 | |R1/R2| | 0.57 |
| Fno | 2.00 | (R4 + R5)/(R4 − R5) | −0.57 |
| HFOV [deg.] | 39.6 | f1/f2 | 0.16 |
| V4 | 25.6 | (f1 + f2)/(f1 − f2) | −1.38 |
| f/EPD | 2.00 | |f/f2| + |f/f3| + |f/f4| + |f/f5| | 0.75 |
| CT5/CT2 | 3.90 | Yc42/Yc52 | 0.75 |
| T34/CT4 | 1.45 | DI/TL | 1.37 |

8th Embodiment

Figure 15:
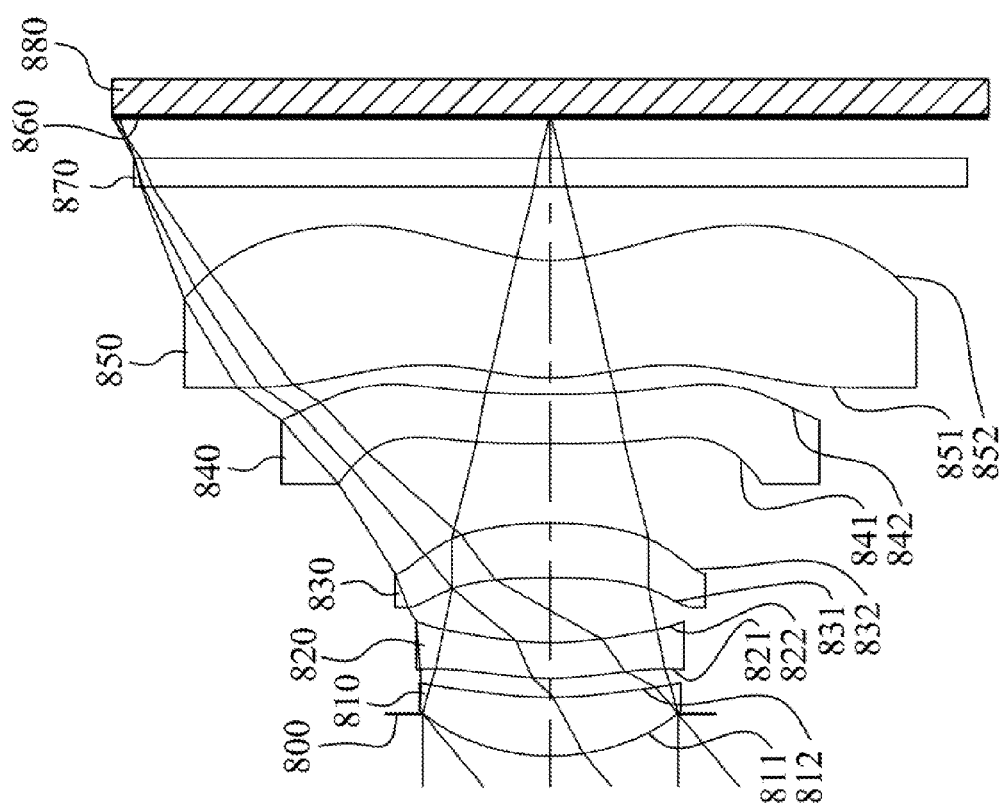
FIG. 15 is a schematic view of an imaging lens assembly according to the 8th embodiment of the present disclosure.
Figure 16:
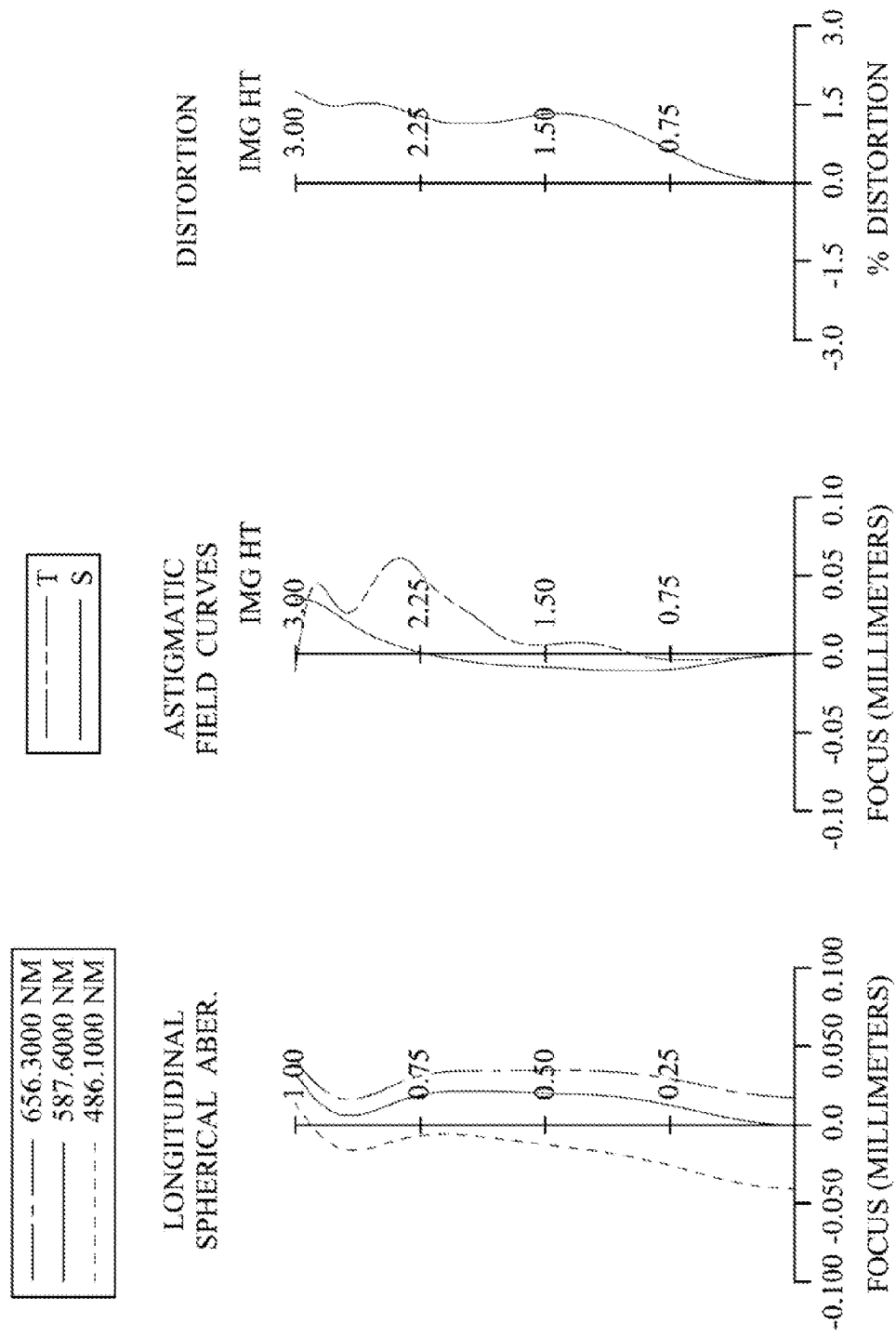
FIG. 16 shows, in order from left to right, spherical aberration curves, astigmatic field curves and a distortion curve of the imaging lens assembly according to the 8th embodiment.

FIG. 15 is a schematic view of an imaging lens assembly according to the 8th embodiment of the present disclosure. FIG. 16 shows, in order from left to right, spherical aberration curves, astigmatic field curves and a distortion curve of the imaging lens assembly according to the 8th embodiment.

In FIG. 15, the imaging lens assembly includes five lens elements with refractive power, in order from an object side to an image side, an aperture stop 800, a first lens element 810, a second lens element 820, a third lens element 830, a fourth lens element 840, a fifth lens element 850, an IR-cut filter 870, an image plane 860 and an image sensor 880.

The first lens element 810 with positive refractive power has a convex object-side surface 811 and a concave image-side surface 812, which are both aspheric, and the first lens element 810 is made of plastic material.

The second lens element 820 with positive refractive power has a convex object-side surface 821 and a concave image-side surface 822, which are both aspheric, and the second lens element 820 is made of plastic material.

The third lens element 830 with positive refractive power has a concave object-side surface 831 and a convex image-side surface 832, which are both aspheric, and the third lens element 830 is made of plastic material.

The fourth lens element 840 with negative refractive power has a concave object-side surface 841 and a concave image-side surface 842, which are both aspheric, and the fourth lens element 840 is made of plastic material. Moreover, the image-side surface 842 of the fourth lens element 840 has at least one inflection point.

The fifth lens element 850 with negative refractive power has a convex object-side surface 851 and a concave image-side surface 852, which are both aspheric, and the fifth lens element 850 is made of plastic material. Moreover, both of the object-side surface 851 and the image-side surface 852 of the fifth lens element 850 have at least one inflection point.

The IR-cut filter 870 is made of glass and located between the fifth lens element 850 and the image plane 860, and will not affect the focal length of the imaging lens assembly.

The detailed optical data of the 8th embodiment are shown in Table 15 and the aspheric surface data are shown in Table 16 below.

TABLE 15

8th Embodiment
f = 3.50 mm, Fno = 2.00, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.288 | | | | |
| 2 | Lens 1 | 1.503 | ASP | 0.402 | Plastic | 1.544 | 55.9 | 5.77 |
| 3 | | 2.608 | ASP | 0.130 | | | | |
| 4 | Lens 2 | 2.041 | ASP | 0.241 | Plastic | 1.640 | 23.3 | 33.13 |
| 5 | | 2.154 | ASP | 0.450 | | | | |
| 6 | Lens 3 | −5.425 | ASP | 0.370 | Plastic | 1.544 | 55.9 | 10.56 |
| 7 | | −2.858 | ASP | 0.550 | | | | |
| 8 | Lens 4 | −34.039 | ASP | 0.335 | Plastic | 1.614 | 25.6 | −17.58 |
| 9 | | 15.875 | ASP | 0.115 | | | | |
| 10 | Lens 5 | 1.580 | ASP | 0.806 | Plastic | 1.544 | 55.9 | −75.92 |
| 11 | | 1.248 | ASP | 0.500 | | | | |
| 12 | IR-cut filter | Plano | | 0.200 | Glass | 1.517 | 64.2 | — |
| 13 | | Plano | | 0.285 | | | | |
| 14 | Image | Plano | | — | | | | |

Note:
Reference wavelength is 587.6 nm (d-line).

TABLE 16

Aspheric Coefficients

| | Surface # | | | | |
|---|---|---|---|---|---|
| | 2 | 3 | 4 | 5 | 6 |
| k = | −4.3274E−02 | −1.9814E+01 | −7.3261E−01 | −2.2559E+00 | −1.4007E+01 |
| A4 = | −2.0343E−02 | −3.3188E−02 | −2.7565E−01 | −1.2137E−01 | −1.0482E−01 |
| A6 = | 1.0873E−01 | −1.5106E−01 | −1.0010E−01 | −9.2568E−02 | −2.1701E−01 |
| A8 = | −2.1607E−01 | 7.2642E−01 | 6.7924E−01 | 2.9793E−01 | −2.0038E−01 |
| A10 = | 3.2880E−01 | −1.3745E+00 | −1.1167E+00 | −1.7230E−02 | 2.0858E+00 |

TABLE 16-continued

| Aspheric Coefficients | | | | |
|---|---|---|---|---|
| A12 = | −2.2744E−01 | 1.2733E+00 | 1.0051E+00 | −2.9019E−01 | −5.0415E+00 |
| A14 = | 2.3970E−02 | −4.3679E−01 | −3.8360E−01 | 2.1726E−01 | 5.2714E+00 |
| A16 = | 5.6346E−02 | 2.9635E−04 | −2.4039E−02 | −1.7098E−10 | −1.9130E+00 |

| Surface # | | | | | |
|---|---|---|---|---|---|
| | 7 | 8 | 9 | 10 | 11 |
| k = | −3.6637E+00 | −3.0000E+01 | −3.0000E+01 | −2.9153E+00 | −3.6926E+00 |
| A4 = | −9.4905E−02 | 3.4597E−01 | 1.5307E−01 | −3.3573E−01 | −1.5010E−01 |
| A6 = | −7.3743E−02 | −6.0658E−01 | −1.7931E−01 | 2.0217E−01 | 8.5286E−02 |
| A8 = | −5.8281E−01 | 5.7503E−01 | 9.0775E−02 | −7.2026E−02 | −3.8385E−02 |
| A10 = | 1.9119E+00 | −3.9187E−01 | −3.8196E−02 | 1.6714E−02 | 1.1312E−02 |
| A12 = | −2.6606E+00 | 1.5651E−01 | 1.2246E−02 | −2.4310E−03 | −1.9639E−03 |
| A14 = | 1.7493E+00 | −3.0552E−02 | −2.1650E−03 | 1.9964E−04 | 1.7937E−04 |
| A16 = | −4.0712E−01 | 1.9696E−03 | 1.4997E−04 | −7.0633E−06 | −6.6242E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following relationships:

| 8th Embodiment | | | |
|---|---|---|---|
| f [mm] | 3.50 | |R1/R2| | 0.58 |
| Fno | 2.00 | (R4 + R5)/(R4 − R5) | −0.43 |
| HFOV [deg.] | 40.0 | f1/f2 | 0.17 |
| V4 | 25.6 | (f1 + f2)/(f1 − f2) | −1.42 |
| f/EPD | 2.00 | |f/f2| + |f/f3| + |f/f4| + |f/f5| | 0.68 |
| CT5/CT2 | 3.34 | Yc42/Yc52 | 0.81 |
| T34/CT4 | 1.64 | DI/TL | 1.37 |

9th Embodiment

Figure 17:
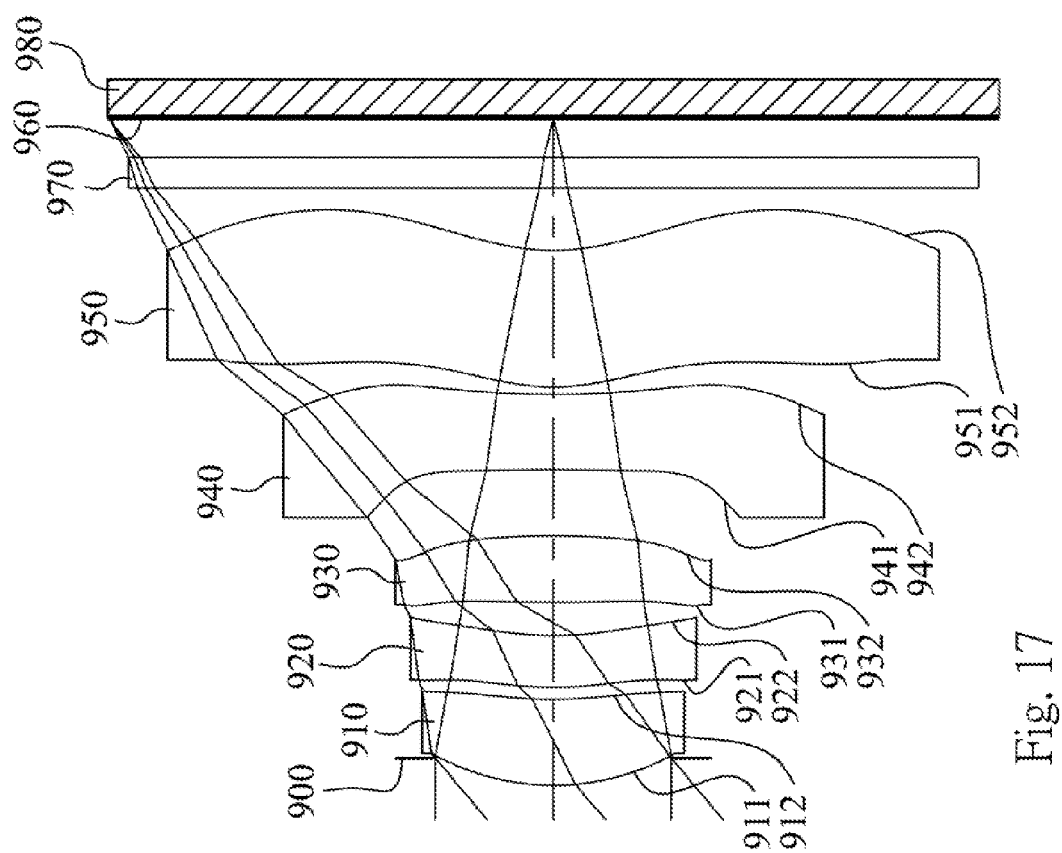
FIG. 17 is a schematic view of an imaging lens assembly according to the 9th embodiment of the present disclosure.
Figure 18:
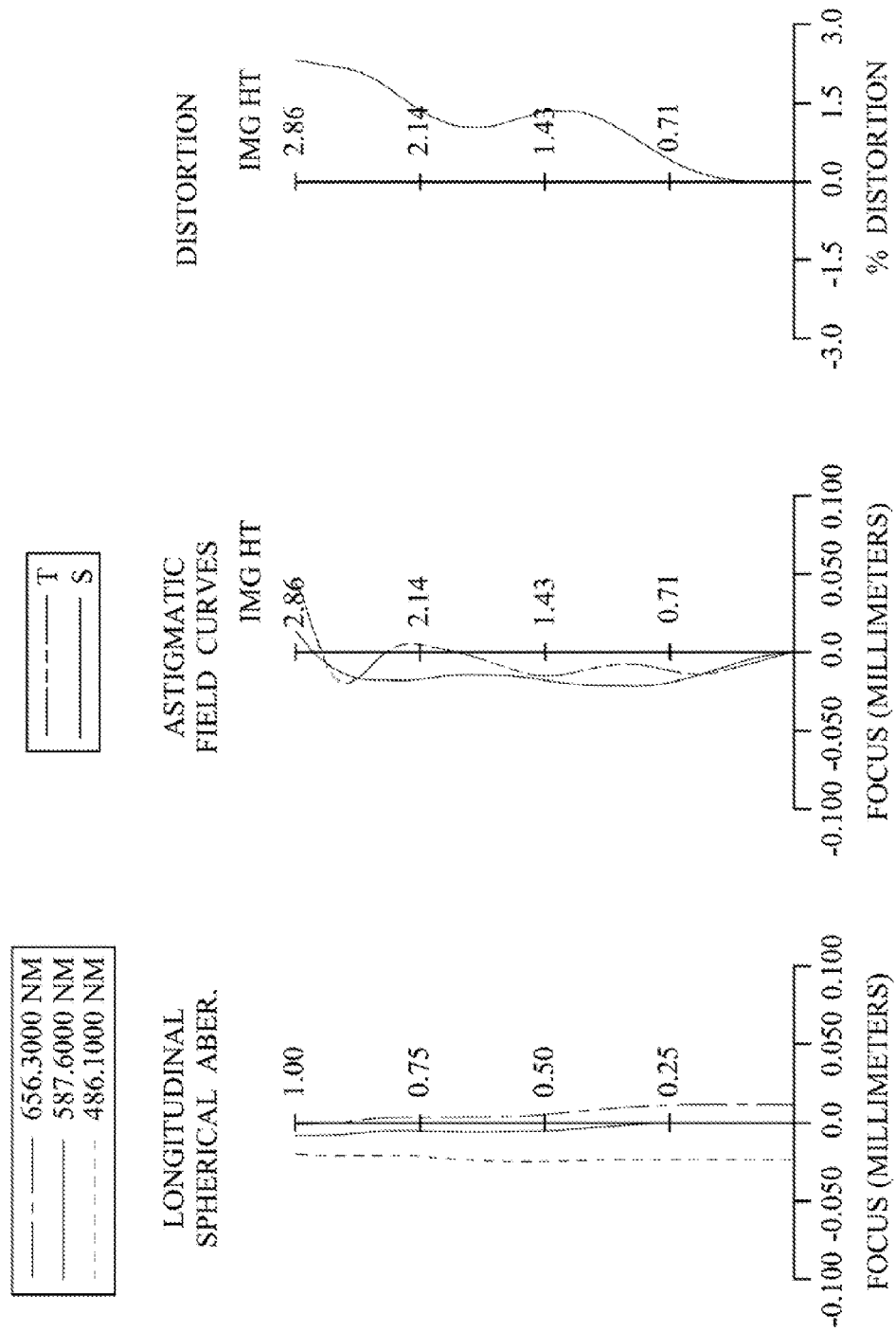
FIG. 18 shows, in order from left to right, spherical aberration curves, astigmatic field curves and a distortion curve of the imaging lens assembly according to the 9th embodiment.

FIG. 17 is a schematic view of an imaging lens assembly according to the 9th embodiment of the present disclosure. FIG. 18 shows, in order from left to right, spherical aberration curves, astigmatic field curves and a distortion curve of the imaging lens assembly according to the 9th embodiment.

In FIG. 17, the imaging lens assembly includes five lens elements with refractive power, in order from an object side to an image side, an aperture stop 900, a first lens element 910, a second lens element 920, a third lens element 930, a fourth lens element 940, a fifth lens element 950, an IR-cut filter 970, an image plane 960 and an image sensor 980.

The first lens element 910 with positive refractive power has a convex object-side surface 911 and a concave image-side surface 912, which are both aspheric, and the first lens element 910 is made of plastic material.

The second lens element 920 with positive refractive power has a convex object-side surface 921 and a concave image-side surface 922, which are both aspheric, and the second lens element 920 is made of plastic material.

The third lens element 930 with positive refractive power has a convex object-side surface 931 and a convex image-side surface 932, which are both aspheric, and the third lens element 930 is made of plastic material.

The fourth lens element 940 with negative refractive power has a concave object-side surface 941 and a concave image-side surface 942, which are both aspheric, and the fourth lens element 940 is made of plastic material. Moreover, the image-side surface 942 of the fourth lens element 940 has at least one inflection point.

The fifth lens element 950 with positive refractive power has a convex object-side surface 951 and a concave image-side surface 952, which are both aspheric, and the fifth lens element 950 is made of plastic material. Moreover, both of the object-side surface 951 and the image-side surface 952 of the fifth lens element 950 have at least one inflection point.

The IR-cut filter 970 is made of glass and located between the fifth lens element 950 and the image plane 960, and will not affect the focal length of the imaging lens assembly.

The detailed optical data of the 9th embodiment are shown in Table 17 and the aspheric surface data are shown in Table 18 below.

TABLE 17

9th Embodiment
f = 3.34 mm, Fno = 2.20, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.175 | | | | |
| 2 | Lens 1 | 1.571 | ASP | 0.553 | Plastic | 1.540 | 56.1 | 5.95 |
| 3 | | 2.695 | ASP | 0.077 | | | | |
| 4 | Lens 2 | 2.146 | ASP | 0.330 | Plastic | 1.583 | 30.2 | 43.92 |
| 5 | | 2.209 | ASP | 0.218 | | | | |
| 6 | Lens 3 | 12.032 | ASP | 0.423 | Plastic | 1.572 | 56.0 | 6.85 |
| 7 | | −5.740 | ASP | 0.430 | | | | |
| 8 | Lens 4 | −7.653 | ASP | 0.481 | Plastic | 1.650 | 21.4 | −5.34 |
| 9 | | 6.510 | ASP | 0.050 | | | | |

TABLE 17-continued

9th Embodiment
f = 3.34 mm, Fno = 2.20, HFOV = 40.0 deg.

| Surface # | | Curvature Radius | Thickness | Material | Index | Abbe # | Focal Length |
|---|---|---|---|---|---|---|---|
| 10 | Lens 5 | 1.345 ASP | 0.879 | Plastic | 1.544 | 55.9 | 9.55 |
| 11 | | 1.397 ASP | 0.400 | | | | |
| 12 | IR-cut filter | Plano | 0.200 | Glass | 1.517 | 64.2 | — |
| 13 | | Plano | 0.256 | | | | |
| 14 | Image | Plano | — | | | | |

Note:
Reference wavelength is 587.6 nm (d-line).

TABLE 18

Aspheric Coefficients

| Surface # | | | | | |
|---|---|---|---|---|---|
| | 2 | 3 | 4 | 5 | 6 |
| k = | −1.3353E−01 | −2.4434E+01 | −3.8789E+00 | −1.6887E+00 | −3.0000E+01 |
| A4 = | −1.1792E−02 | −7.3289E−02 | −2.5578E−01 | −8.6363E−02 | −1.6255E−02 |
| A6 = | 6.3775E−02 | −1.6930E−01 | −7.5585E−02 | −1.4093E−01 | −1.8234E−01 |
| A8 = | −1.9325E−01 | 6.7357E−01 | 5.5330E−01 | 2.4801E−01 | −2.3775E−01 |
| A10 = | 3.2094E−01 | −1.4503E+00 | −1.1673E+00 | −7.6793E−02 | 2.0722E+00 |
| A12 = | −3.1732E−01 | 1.3101E+00 | 1.0342E+00 | −2.5887E−01 | −5.0208E+00 |
| A14 = | 1.4526E−01 | −2.2165E−01 | −1.2413E−01 | 2.7252E−01 | 5.2993E+00 |
| A16 = | −6.9053E−07 | 1.0587E−06 | −1.0539E−06 | 4.4987E−06 | −1.9572E+00 |

| Surface # | | | | | |
|---|---|---|---|---|---|
| | 7 | 8 | 9 | 10 | 11 |
| k = | −2.9895E+01 | −3.0000E+01 | −3.0000E+01 | −1.0244E+00 | −1.8146E+00 |
| A4 = | −2.7039E−02 | 2.8221E−01 | 8.0963E−02 | −3.5987E−01 | −1.7868E−01 |
| A6 = | −9.9034E−02 | −6.3393E−01 | −1.4789E−01 | 2.0015E−01 | 9.1916E−02 |
| A8 = | −5.7172E−01 | 5.7905E−01 | 9.0568E−02 | −7.1674E−02 | −3.9046E−02 |
| A10 = | 1.9151E+00 | −4.0497E−01 | −3.9053E−02 | 1.6737E−02 | 1.1299E−02 |
| A12 = | −2.6686E+00 | 1.4576E−01 | 1.2076E−02 | −2.4304E−03 | −1.9553E−03 |
| A14 = | 1.7490E+00 | −2.9333E−02 | −2.1652E−03 | 1.9946E−04 | 1.8011E−04 |
| A16 = | −3.7724E−01 | 9.1698E−03 | 1.6066E−04 | −7.1057E−06 | −6.7595E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following relationships:

| 9th Embodiment | | | |
|---|---|---|---|
| f [mm] | 3.34 | |R1/R2| | 0.58 |
| Fno | 2.20 | (R4 + R5)/(R4 − R5) | −1.45 |
| HFOV [deg.] | 40.0 | f1/f2 | 0.14 |
| V4 | 21.4 | (f1 + f2)/(f1 − f2) | −1.31 |
| f/EPD | 2.20 | |f/f2| + |f/f3| + |f/f4| + |f/f5| | 1.54 |
| CT5/CT2 | 2.66 | Yc42/Yc52 | 0.70 |
| T34/CT4 | 0.89 | DI/TL | 1.33 |

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the invention and its practical applications, to thereby enable others skilled in the art to best utilize the invention and various embodiments with various modifications as are suited to the particular use contemplated. The embodiments depicted above and the appended drawings are exemplary and are not intended to be exhaustive or to limit the scope of the present disclosure or invention to the precise forms disclosed. Many modifications and variations are possible in view of the above teachings.

What is claimed is:

1. An imaging lens assembly comprising five lens elements with refractive power, in order from an object side to an image side:
   a first lens element with positive refractive power having a convex object-side surface;
   a second lens element having positive refractive power;
   a third lens element having refractive power;
   a fourth lens element with refractive power having a concave image-side surface, wherein both of an object-side surface and the image-side surface of the fourth lens element are aspheric; and
   a fifth lens element with refractive power having a concave image-side surface, wherein at least one inflection point is formed on the image-side surface of the fifth lens element, and both of an object-side surface and the image-side surface of the fifth lens element are aspheric;
   wherein a focal length of the first lens element is f1, a focal length of the second lens element is f2, a curvature radius of the object-side surface of the first lens element is R1, a curvature radius of an image-side surface of the first lens element is R2, and the following relationships are satisfied:

$0 < f1/f2 < 1$; and $|R1/R2| < 1$.

2. The imaging lens assembly of claim 1, wherein the first lens element has a concave image-side surface.

3. The imaging lens assembly of claim 1, wherein the object-side surface of the fifth lens element is convex.

4. The imaging lens assembly of claim 1, wherein the third lens element has positive refractive power.

5. The imaging lens assembly of claim 1, wherein the fourth lens element has negative refractive power.

6. The imaging lens assembly of claim 1, wherein the second lens element has a convex object-side surface.

7. The imaging lens assembly of claim 6, wherein the second lens element has a concave image-side surface.

8. The imaging lens assembly of claim 1, wherein the third lens element has a convex image-side surface.

9. The imaging lens assembly of claim 8, wherein the third lens element has a concave object-side surface.

10. The imaging lens assembly of claim 1, wherein a vertical distance between a non-axial critical point on the image-side surface of the fourth lens element and an optical axis is Yc42, a vertical distance between a non-axial critical point on the image-side surface of the fifth lens element and the optical axis is Yc52, and the following relationship is satisfied:

$0.5 < Yc42/Yc52 < 1.0$.

11. The imaging lens assembly of claim 10, wherein the focal length of the first lens element is f1, the focal length of the second lens element is f2, and the following relationship is satisfied:

$-5 < (f1+f2)/(f1-f2) < -1$.

12. The imaging lens assembly of claim 10, wherein a curvature radius of an image-side surface of the second lens element is R4, a curvature radius of an object-side surface of the third lens element is R5, and the following relationship is satisfied:

$-2 < (R4+R5)/(R4-R5) < 0$.

13. The imaging lens assembly of claim 10, wherein a central thickness of the second lens element is CT2, a central thickness of the fifth lens element is CT5, and the following relationship is satisfied:

$2.0 < CT5/CT2 < 5.5$.

14. The imaging lens assembly of claim 1, wherein an Abbe number of the fourth lens element is V4, and the following relationship is satisfied:

$10 < V4 < 30$.

15. The imaging lens assembly of claim 1, wherein both of the object-side surface and the image-side surface of the fourth lens element have at least one inflection point, and both of the object-side surface and the image-side surface of the fifth lens element have at least one inflection point.

16. An imaging lens assembly comprising five lens elements with refractive power, in order from an object side to an image side:
a first lens element with positive refractive power having a convex object-side surface;
a second lens element having positive refractive power;
a third lens element having refractive power;
a fourth lens element with refractive power having a concave image-side surface, wherein both of an object-side surface and the image-side surface of the fourth lens element are aspheric; and
a fifth lens element with refractive power having a concave image-side surface, wherein at least one inflection point is formed on the image-side surface of the fifth lens element, and both of an object-side surface and the image-side surface of the fifth lens element are aspheric;
wherein a focal length of the first lens element is f1, a focal length of the second lens element is f2, an axial distance between the third lens element and the fourth lens element is T34, and a central thickness of the fourth lens element is CT4, the following relationships are satisfied:

$0 < f/f2 < 5$; and $0.4 < T34/CT4 < 3.0$.

17. The imaging lens assembly of claim 16, wherein the focal length of the first lens element is f1, the focal length of the second lens element is f2, and the following relationship is satisfied:

$-3.5 < (f1+f2)/(f1-f2) < -1$.

18. The imaging lens assembly of claim 16, wherein an Abbe number of the fourth lens element is V4, and the following relationship is satisfied:

$10 < V4 < 30$.

19. The imaging lens assembly of claim 16, wherein a focal length of the imaging lens assembly is f, an entrance pupil diameter of the imaging lens assembly is EPD, and the following relationship is satisfied:

$1.2 < f/EPD < 2.4$.

20. The imaging lens assembly of claim 16, wherein half of the maximal field of view of the imaging lens assembly is HFOV, and the following relationship is satisfied:

36 degrees < HFOV < 50 degrees.

21. The imaging lens assembly of claim 16, further comprising
an image sensor disposed on an image plane, wherein a diagonal length of an effective photosensitive area of the image sensor is DI, an axial distance between the object-side surface of the first lens element and the image plane is TL, and the following relationship is satisfied:

$1.2 < DI/TL < 2.0$.

22. The imaging lens assembly of claim 16, further comprising:
a stop disposed between an imaged object and the object-side surface of the first lens element.

23. The imaging lens assembly of claim 16, wherein a focal length of the imaging lens assembly is f, the focal length of the second lens element is f2, a focal length of the third lens element is f3, a focal length of the fourth lens element is f4, a focal length of the fifth lens element is f5, and the following relationship is satisfied:

$|f/f2|+|f/f3|+|f/f4|+|f/f5| < 1.0$.

24. The imaging lens assembly of claim 16, wherein a vertical distance between a non-axial critical point on the image-side surface of the fourth lens element and an optical axis is Yc42, a vertical distance between a non-axial critical point on the image-side surface of the fifth lens element and the optical axis is Yc52, and the following relationship is satisfied:

$0.5 < Yc42/Yc52 < 1.0$.

25. An image capturing device, comprising the imaging lens assembly as set forth herein in claim 16 and an image sensor located on an image plane side of said imaging lens assembly.

* * * * *

UNITED STATES PATENT AND TRADEMARK OFFICE
CERTIFICATE OF CORRECTION

PATENT NO.           : 8,947,790 B2                                    Page 1 of 1
APPLICATION NO.      : 13/921223
DATED                : February 3, 2015
INVENTOR(S)          : Tsung-Han Tsai et al.

It is certified that error appears in the above-identified patent and that said Letters Patent is hereby corrected as shown below:

In the Claims (1) In column 31, line 37, Claim 11 of the issued patent reads as "-5<(f1+f2)(f1-f2)<-1", but it should read as "-5<(f1+f2)/(f1-f2)<-1".
(2) In column 32, line 15, Claim 16 of the issued patent reads as "0<f/f2<5", but it should read as "0<f1/f2<5".

Signed and Sealed this
Eleventh Day of August, 2015

Michelle K. Lee
*Director of the United States Patent and Trademark Office*